United States Patent
Bowers

(10) Patent No.: US 12,536,806 B2
(45) Date of Patent: Jan. 27, 2026

(54) IMAGE POSITION DEPENDENT BLUR CONTROL WITHIN HDR BLENDING SCHEME

(71) Applicant: Mobileye Vision Technologies Ltd., Jerusalem (IL)

(72) Inventor: Gabriel Bowers, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 14 days.

(21) Appl. No.: 18/262,061

(22) PCT Filed: Dec. 14, 2022

(86) PCT No.: PCT/IB2022/062238
§ 371 (c)(1),
(2) Date: Jul. 19, 2023

(87) PCT Pub. No.: WO2023/126736
PCT Pub. Date: Jul. 6, 2023

(65) Prior Publication Data
US 2024/0296682 A1    Sep. 5, 2024

Related U.S. Application Data

(60) Provisional application No. 63/295,043, filed on Dec. 30, 2021.

(51) Int. Cl.
*G06V 20/56*    (2022.01)
(52) U.S. Cl.
CPC .................................. *G06V 20/56* (2022.01)

(58) Field of Classification Search
CPC ....................................................... G06V 20/56
See application file for complete search history.

(56) References Cited

U.S. PATENT DOCUMENTS

| | | | |
|---|---|---|---|
| 9,179,072 B2 * | 11/2015 | Stein | G06V 40/103 |
| 11,145,076 B1 * | 10/2021 | Horesh | G06T 7/246 |
| 11,148,676 B2 * | 10/2021 | Kumar | G06T 7/80 |
| (Continued) | | | |

FOREIGN PATENT DOCUMENTS

| | | |
|---|---|---|
| CN | 112528944 A | 3/2021 |
| KR | 20140056510 A | 5/2014 |
| WO | 2020223519 A1 | 11/2020 |

OTHER PUBLICATIONS

Mar. 15, 2023 (PCT) International Search Report and Written Opinion—App. PCT/IB2022/062238.

*Primary Examiner* — Irfan Habib
(74) *Attorney, Agent, or Firm* — Banner & Witcoff, Ltd.

(57) ABSTRACT

Techniques are disclosed for improving the detection of objects having different relative angular velocities with respect to the vehicle cameras. The techniques function to selectively weight pixel exposure values to favor longer or shorter exposure times for certain pixels within the pixel array over others. A selective pixel exposure weighting system is disclosed that functions to weight the exposure values for pixels acquired within a pixel array based upon the position of the pixel within the pixel array and other factors such as the movement and/or orientation of the vehicle. The techniques advantageously enable an autonomous vehicle (AV) or advanced driver-assistance systems (ADAS) to make better use of existing cameras and eliminate motion blur and other artifacts.

22 Claims, 12 Drawing Sheets

(56) References Cited

U.S. PATENT DOCUMENTS

| | | | |
|---|---|---|---|
| 11,351,991 B2* | 6/2022 | Ghafarianzadeh | B60W 30/09 |
| 11,481,884 B2* | 10/2022 | Shen | G06V 10/22 |
| 11,562,572 B2* | 1/2023 | Agarwal | H04N 23/61 |
| 11,922,639 B2* | 3/2024 | Li | H04N 23/12 |
| 2009/0225189 A1 | 9/2009 | Morin | |
| 2012/0056982 A1* | 3/2012 | Katz | G06F 3/017 |
| | | | 348/43 |
| 2018/0109715 A1 | 4/2018 | Mangla et al. | |
| 2018/0220054 A1* | 8/2018 | Swami | H04N 25/58 |
| 2018/0284802 A1* | 10/2018 | Tsai | G05D 1/0253 |
| 2018/0302544 A1 | 10/2018 | Dhiman et al. | |
| 2021/0133939 A1* | 5/2021 | Hanwell | H04N 25/585 |
| 2021/0337101 A1* | 10/2021 | Yuan | H04N 23/6812 |
| 2021/0374518 A1* | 12/2021 | Zhu | G06N 3/045 |
| 2022/0006939 A1* | 1/2022 | Lee | G01B 11/026 |
| 2022/0053117 A1* | 2/2022 | Patel | H04N 23/73 |
| 2022/0148320 A1* | 5/2022 | Alakarhu | G08G 1/0175 |
| 2022/0151144 A1* | 5/2022 | Ramsay | G06V 20/10 |
| 2022/0188553 A1* | 6/2022 | Agarwal | G05D 1/646 |
| 2022/0301105 A1* | 9/2022 | Kim | H04N 23/60 |
| 2023/0053785 A1* | 2/2023 | Carvalho | G06V 10/776 |
| 2023/0067026 A1* | 3/2023 | Huts | G06V 20/00 |
| 2024/0062656 A1* | 2/2024 | Forscher | G08G 1/163 |
| 2024/0078790 A1* | 3/2024 | Sundareshan | G06V 10/761 |
| 2024/0296682 A1* | 9/2024 | Bowers | H04N 23/684 |
| 2024/0414337 A1* | 12/2024 | Kundu | H04N 19/12 |
| 2025/0022278 A1* | 1/2025 | Li | G01S 17/931 |
| 2025/0191145 A1* | 6/2025 | Geng | G06T 5/60 |
| 2025/0191385 A1* | 6/2025 | Ko | G06V 20/56 |

* cited by examiner

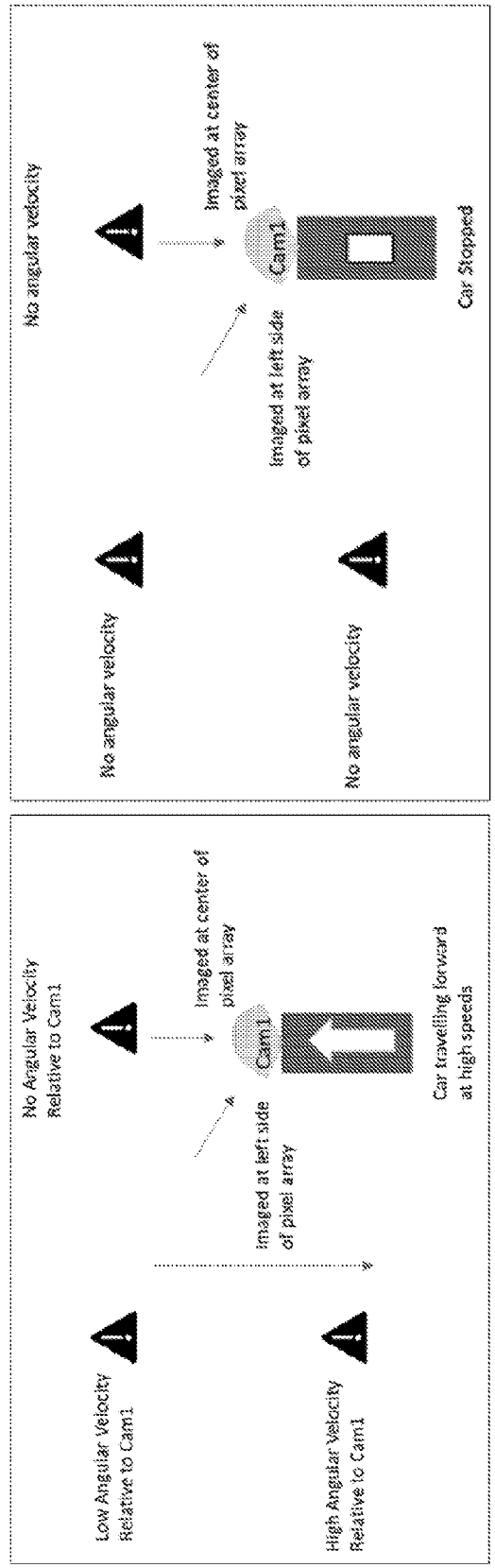

670

IMAGE POSITION DEPENDENT BLUR CONTROL WITHIN HDR BLENDING SCHEME

CROSS-REFERENCE TO RELATED APPLICATIONS

This application claims priority to provisional application No. 63/295,043, filed on Dec. 30, 2021, the contents of which are incorporated herein by reference in their entirety.

TECHNICAL FIELD

Aspects described herein generally relate to pixel blending techniques and, in particular, to pixel blending techniques that adjust the pixel weighting for different exposures based upon pixel position within an image and the position of the camera acquiring the image.

BACKGROUND

Autonomous vehicle (AV) and advanced driver-assistance systems (ADAS) function to identify all objects on the road including people, signs, and light sources to keep its passengers and surrounding road users and road infrastructure safe. For this purpose, one or more cameras may be installed inside and/or outside of the vehicle. However, the current use of cameras for AVs and ADAS have drawbacks, as the cameras often fail to capture high quality images as a result of the relative speed of objects with respect to the vehicle.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIG. 3A illustrates examples of objects having different angular velocities with respect to the position of a vehicle camera, in accordance with one or more aspects of the present disclosure;

FIG. 3B illustrates examples of objects having no angular velocity with respect to the position of a vehicle camera, in accordance with one or more aspects of the present disclosure;

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
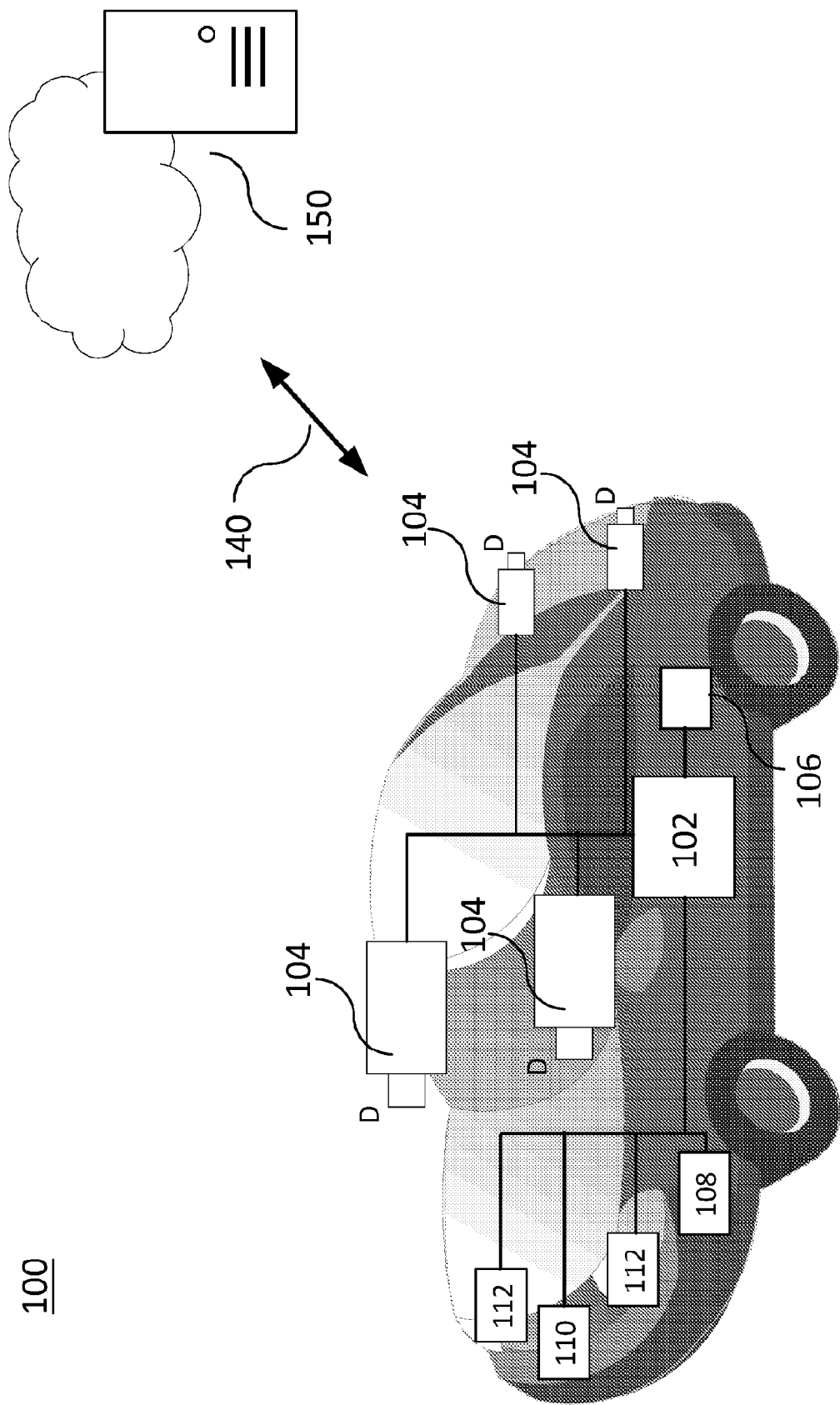
FIG. 1 illustrates an example vehicle in accordance with one or more aspects of the present disclosure.

FIG. 1 shows a vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed herein, the Figures are not to scale) and are provided by way of example and not limitation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driving assistance control system, including AV and/or advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle's systems and/or part of an aftermarket system that is installed in the vehicle 100.

The one or more processors 102 may be integrated with or separate from an electronic control unit (ECU) of the vehicle 100 or an engine control unit of the vehicle 100, which may be considered herein as a specialized type of an electronic control unit. The safety system 200 may generate data to control or assist to control the ECU and/or other components of the vehicle 100 to directly or indirectly control the driving of the vehicle 100. However, the aspects described herein are not limited to implementation within autonomous or semi-autonomous vehicles, as these are provided by way of example. The aspects described herein may be implemented as part of any suitable type of vehicle that may be capable of travelling with or without any suitable level of human assistance in a particular driving environment. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various aspects. In aspects implemented as part of a standard vehicle, it is understood that the safety system 200 may perform alternate functions, and thus in accordance with such aspects the safety system 200 may alternatively represent any suitable type of system that may be implemented by a standard vehicle without necessarily utilizing autonomous or semi-autonomous control related functions.

Figure 2:
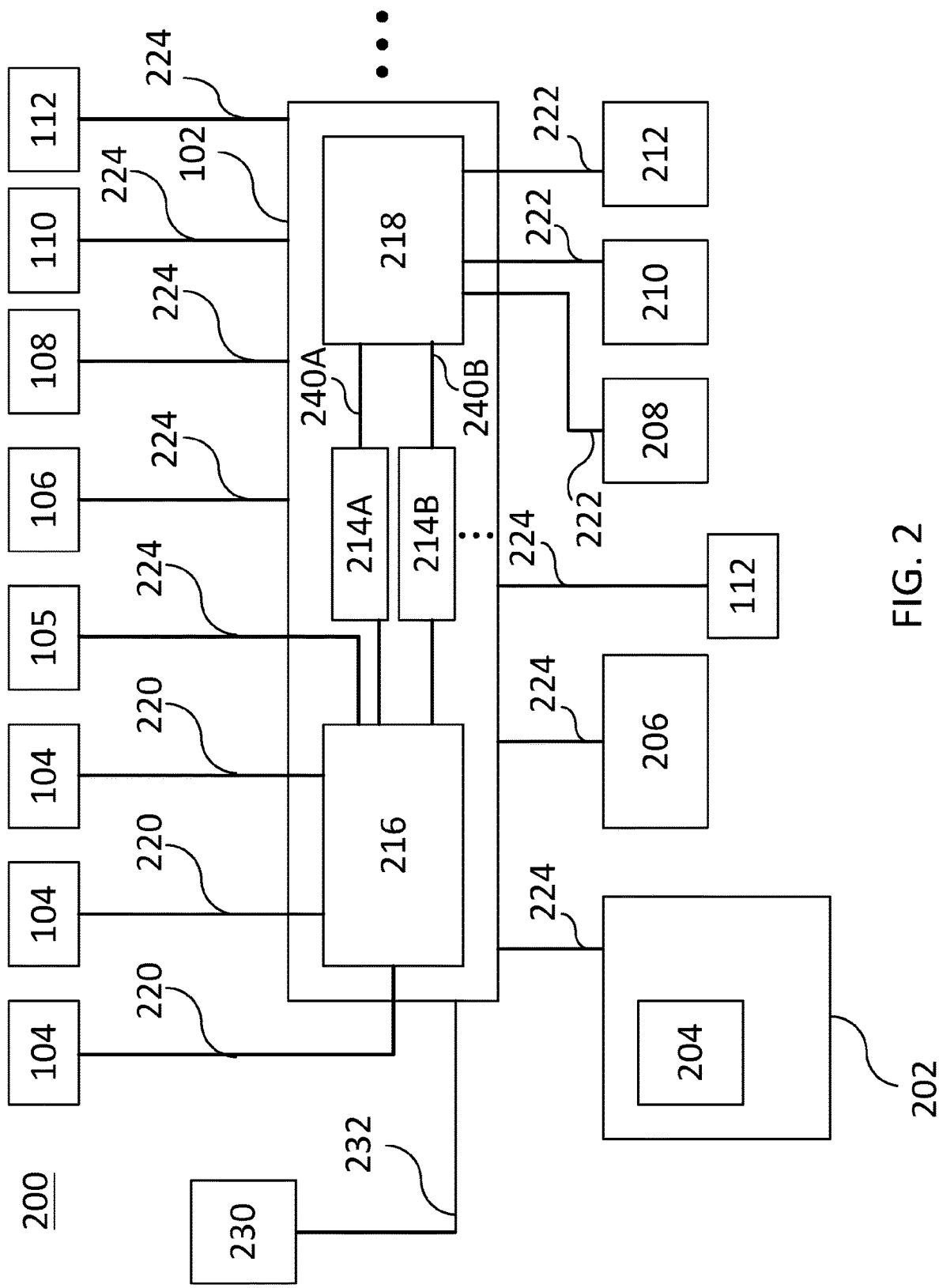
FIG. 2 illustrates various example electronic components of a safety system of a vehicle in accordance with one or more aspects of the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as, e.g., one or more cameras or any other suitable sensor configured to perform image acquisition over any suitable range of wavelengths, one or more position sensors 106, which may be implemented as a position and/or location-identifying system such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212.

The wireless transceivers 208, 210, 212 may be configured to operate in accordance with any suitable number and/or type of desired radio communication protocols or standards. By way of example, a wireless transceiver (e.g., a first wireless transceiver 208) may be configured in accordance with a Short Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution-LTE), or a 5G mobile radio communication standard in accordance with corresponding 3GPP (3rd Generation Partnership Project) standards, the most recent version at the time of this writing being the 3GPP Release 16 (2020).

As a further example, a wireless transceiver (e.g., a third wireless transceiver 212) may be configured in accordance with a Wireless Local Area Network communication protocol or standard such as e.g. in accordance with IEEE 802.11 Working Group Standards, the most recent version at the time of this writing being IEEE Std 802.11™—2020, published Feb. 26, 2021 (e.g. 802.11, 802.11a, 802.11b, 802.11g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. As additional examples, one or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

One or more of the wireless transceivers 208, 210, 212 may additionally or alternatively be configured to enable communications between the vehicle 100 and one or more other remote computing devices via one or more wireless links 140. This may include, for instance, communications with a remote server or other suitable computing system 150 as shown in FIG. 1. The example shown FIG. 1 illustrates such a remote computing system 150 as a cloud computing system, although this is by way of example and not limitation, and the computing system 150 may be implemented in accordance with any suitable architecture and/or network and may constitute one or several physical computers, servers, processors, etc. that comprise such a system. As another example, the computing system 150 may be implemented as an edge computing system and/or network.

The one or more processors 102 may implement any suitable type of processing circuitry, other suitable circuitry, memory, etc., and utilize any suitable type of architecture. The one or more processors 102 may be configured as a controller implemented by the vehicle 100 to perform various vehicle control functions, navigational functions, etc. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance. The one or more processors and/or the safety system 200 may form the entirety of or portion of an advanced driver-assistance system (ADAS) or an autonomous vehicle (AV) system.

Moreover, one or more of the processors 214A, 214B, 216, and/or 218 of the one or more processors 102 may be configured to work in cooperation with one another and/or with other components of the vehicle 100 to collect information about the environment (e.g., sensor data, such as images, depth information (for a Lidar for example), etc.). In this context, one or more of the processors 214A, 214B, 216, and/or 218 of the one or more processors 102 may be referred to as "processors." The processors may thus be implemented (independently or together) to create mapping information from the harvested data, e.g., Road Segment Data (RSD) information that may be used for Road Experience Management (REM) mapping technology, the details of which are further described below. As another example, the processors can be implemented to process mapping information (e.g. roadbook information used for REM mapping technology) received from remote servers over a wireless communication link (e.g. link 140) to localize the vehicle 100 on an AV map, which can be used by the processors to control the vehicle 100.

The one or more processors 102 may include one or more application processors 214A, 214B, an image processor 216, a communication processor 218, and may additionally or alternatively include any other suitable processing device, circuitry, components, etc. not shown in the Figures for purposes of brevity. Similarly, image acquisition devices 104 may include any suitable number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218. Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, e.g., via a third data interface. The third data interface may include any wired and/or wireless third link 224 or third links 224. Furthermore, the position sensors 106 may be coupled to each of the one or more processors 102, e.g., via the third data interface.

Each processor 214A. 214B, 216, 218 of the one or more processors 102 may be implemented as any suitable number and/or type of hardware-based processing devices (e.g. processing circuitry), and may collectively, i.e. with the one or more processors 102, form one or more types of controllers as discussed herein. The architecture shown in FIG. 2 is provided for ease of explanation and as an example, and the vehicle 100 may include any suitable number of the one or more processors 102, each of which may be similarly configured to utilize data received via the various interfaces and to perform one or more specific tasks.

For example, the one or more processors 102 may form a controller that is configured to perform various control-related functions of the vehicle 100 such as the calculation and execution of a specific vehicle following speed, velocity, acceleration, braking, steering, trajectory, etc. As another example, the vehicle 100 may, in addition to or as an alternative to the one or more processors 102, implement other processors (not shown) that may form a different type of controller that is configured to perform additional or alternative types of control-related functions. Each controller may be responsible for controlling specific subsystems and/or controls associated with the vehicle 100. In accordance with such aspects, each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller in this example.

To provide another example, the application processors 214A, 214B may individually represent respective controllers that work in conjunction with the one or more processors 102 to perform specific control-related tasks. For instance, the application processor 214A may be implemented as a first controller, whereas the application processor 214B may be implemented as a second and different type of controller that is configured to perform other types of tasks as discussed further herein. In accordance with such aspects, the one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218 in this example.

The one or more processors 102 may additionally be implemented to communicate with any other suitable components of the vehicle 100 to determine a state of the vehicle while driving or at any other suitable time. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (e.g. CAN bus communications). Using the data received via the data interface 232, the one or more processors 102 may determine any suitable type of vehicle status information such as the current drive gear, current engine speed, acceleration capabilities of the vehicle 100, etc. As another example, various metrics used to control the speed, acceleration, braking, steering, etc. may be received via the vehicle components 230, which may include receiving any suitable type of signals that are indicative of such metrics or varying degrees of how such metrics vary over time (e.g. brake force, wheel angle, reverse gear, etc.).

The one or more processors 102 may include any suitable number of other processors 214A, 214B, 216, 218, each of which may comprise processing circuitry such as sub-processors, a microprocessor, pre-processors (such as an image pre-processor), graphics processors, a central processing unit (CPU), support circuits, digital signal processors, integrated circuits, memory, or any other types of devices suitable for running applications and for data processing (e.g. image processing, audio processing, etc.) and analysis and/or to enable vehicle control to be functionally realized. In some aspects, each processor 214A, 214B, 216, 218 may include any suitable type of single or multi-core processor, microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective processor 214A, 214B, 216, 218, or accessed via another memory that is part of the safety system 200 or external to the safety system 200. This memory may include the one or more memories 202. Regardless of the particular type and location of memory, the memory may store software and/or executable (i.e. computer-readable) instructions that, when executed by a relevant processor (e.g., by the one or more processors 102, one or more of the processors 214A, 214B, 216, 218, etc.), controls the operation of the safety system 200 and may perform other functions such those identified with the aspects described in further detail below. This may include, for instance, identifying the location of the vehicle 100 (e.g. via the one or more position sensors 106), identifying a location of a particular camera identified with the image acquisition devices 104, modifying a weighting applied to exposure values identified with pixels acquired via a pixel array identified with the image acquisition devices 104 to generate output images, etc., as further discussed herein.

A relevant memory accessed by the one or more processors 214A, 214B, 216, 218 (e.g. the one or more memories 202) may also store one or more databases and image processing software, as well as a trained system, such as a neural network, or a deep neural network, for example, that may be utilized to perform the tasks in accordance with any of the aspects as discussed herein. A relevant memory accessed by the one or more processors 214A, 214B, 216, 218 (e.g. the one or more memories 202) may be implemented as any suitable number and/or type of non-transitory computer-readable medium such as random access memories, read only memories, flash memories, disk drives, optical storage, tape storage, removable storage, or any other suitable types of storage.

The components associated with the safety system 200 as shown in FIG. 2 are illustrated for ease of explanation and by way of example and not limitation. The safety system 200 may include additional, fewer, or alternate components as shown and discussed herein with reference to FIG. 2. Moreover, one or more components of the safety system 200 may be integrated or otherwise combined into common processing circuitry components or separated from those shown in FIG. 2 to form distinct and separate components. For instance, one or more of the components of the safety system 200 may be integrated with one another on a common die or chip. As an illustrative example, the one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions. Again, such a controller or system may be configured to execute the various functions related to modifying a weighting applied to exposure values identified with pixels acquired by a pixel array identified with the image acquisition devices 104 to generate output images, as further discussed herein, to control various aspects of the sensor-based images, the vehicle 100, and/or to control the state of the vehicle 100, as discussed in further detail herein.

In some aspects, the safety system 200 may further include components such as a speed sensor 108 (e.g. a speedometer) for measuring a speed of the vehicle 100. The safety system 200 may also include one or more sensors 105, which may include one or more accelerometers (either single axis or multiaxis) for measuring accelerations of the vehicle 100 along one or more axes, and additionally or alternatively one or more gyro sensors. The one or more sensors 105 may further include additional sensors or different sensor types such as an ultrasonic sensor, infrared sensors, a thermal sensor, digital compasses, and the like. The safety system 200 may also include one or more radar sensors 110 and one or more LIDAR sensors 112 (which may be integrated in the head lamps of the vehicle 100). The radar sensors 110 and/or the LIDAR sensors 112 may be configured to provide pre-processed sensor data, such as radar target lists or LIDAR target lists. The third data interface (e.g., one or more links 224) may couple the one or more sensors 105, the speed sensor 108, the one or more radar sensors 110, and the one or more LIDAR sensors 112 to at least one of the one or more processors 102.

Autonomous Vehicle (AV) Map Data and Road Experience Management (REM)

Data referred to as REM map data (or alternatively as Roadbook Map data or AV map data), may also be stored in a relevant memory accessed by the one or more processors 214A, 214B, 216, 218 (e.g. the one or more memories 202) or in any suitable location and/or format, such as in a local or cloud-based database, accessed via communications between the vehicle and one or more external components (e.g. via the transceivers 208, 210, 212), etc. It is noted that although referred to herein as "AV map data," the data may be implemented in any suitable vehicle platform, which may include vehicles having any suitable level of automation (e.g. levels 0-5), as noted above.

Regardless of where the AV map data is stored and/or accessed, the AV map data may include a geographic location of known landmarks that are readily identifiable in the navigated environment in which the vehicle 100 travels. The location of the landmarks may be generated from a historical accumulation from other vehicles driving on the same road that collect data regarding the appearance and/or location of landmarks (e.g. "crowd sourcing"). Thus, each landmark may be correlated to a set of predetermined geographic coordinates that has already been established. Therefore, in addition to the use of location-based sensors such as GNSS, the database of landmarks provided by the AV map data enables the vehicle 100 to identify the landmarks using the one or more image acquisition devices 104. Once identified, the vehicle 100 may implement other sensors such as LIDAR, accelerometers, speedometers, etc. or images from the image acquisitions device 104, to evaluate the position and location of the vehicle 100 with respect to the identified landmark positions.

Furthermore, the vehicle 100 may determine its own motion, which is referred to as "ego-motion." Ego-motion is generally used for computer vision algorithms and other similar algorithms to represent the motion of a vehicle camera across a plurality of frames, which provides a baseline (i.e. a spatial relationship) that can be used to compute the 3D structure of a scene from respective images. The vehicle 100 may analyze its own ego-motion to track the position and orientation of the vehicle 100 with respect to the identified known landmarks. Because the landmarks are identified with predetermined geographic coordinates, the vehicle 100 may determine its geographic location and position on a map based upon a determination of its position with respect to identified landmarks using the landmark-correlated geographic coordinates. Doing so provides distinct advantages that combine the benefits of smaller scale position tracking with the reliability of GNSS positioning systems while avoiding the disadvantages of both systems. It is further noted that the analysis of ego motion in this manner is one example of an algorithm that may be implemented with monocular imaging to determine a relationship between a vehicle's location and the known location of known landmark(s), thus assisting the vehicle to localize itself. However, ego-motion is not necessary or relevant for other types of technologies, and therefore is not essential for localizing using monocular imaging. Thus, in accordance with the aspects as described herein, the vehicle 100 may leverage any suitable type of localization technology.

Thus, the AV map data is generally constructed as part of a series of steps, which may involve any suitable number of vehicles that opt into the data collection process. As each vehicle collects data, the data is classified into tagged data points, which are then transmitted to the cloud or to another suitable external location. A suitable computing device (e.g. a cloud server) then analyzes the data points from individual drives on the same road, and aggregates and aligns these data points with one another. After alignment has been performed, the data points are used to define a precise outline of the road infrastructure. Next, relevant semantics are identified that enable vehicles to understand the immediate driving environment, i.e. features and objects are defined that are linked to the classified data points. The features and objects defined in this manner may include, for instance, traffic lights, road arrows, signs, road edges, drivable paths, lane split points, stop lines, lane markings, etc. to the driving environment so that a vehicle may readily identify these features and objects using the AV map data. This information is then compiled into a Roadbook Map, which constitutes a bank of driving paths, semantic road information such as features and objects, and aggregated driving behavior.

A map database 204, which may be stored as part of the one or more memories 202 or accessed via the computing system 150 via the link(s) 140, for instance, may include any suitable type of database configured to store (digital) map data for the vehicle 100, e.g., for the safety system 200. The one or more processors 102 may download information to the map database 204 over a wired or wireless data connection (e.g. the link(s) 140) using a suitable communication network (e.g., over a cellular network and/or the Internet, etc.). Again, the map database 204 may store the AV map data, which includes data relating to the position, in a reference coordinate system, of various landmarks such as items, including roads, water features, geographic features, businesses, points of interest, restaurants, gas stations, etc.

The map database 204 may thus store, as part of the AV map data, not only the locations of such landmarks, but also descriptors relating to those landmarks, including, for example, names associated with any of the stored features, and may also store information relating to details of the items such as a precise position and orientation of items. In some cases, the Roadbook Map data may store a sparse data model including polynomial representations of certain road features (e.g., lane markings) or target trajectories for the vehicle 100. The AV map data may also include stored representations of various recognized landmarks that may be provided to determine or update a known position of the vehicle 100 with respect to a target trajectory. The landmark representations may include data fields such as landmark type, landmark location, etc., among other potential identifiers. The AV map data may also include non-semantic features including point clouds of certain objects or features in the environment, and feature point and descriptors.

The map database 204 may be augmented with data in addition to the AV map data, and/or the map database 204 and/or the AV map data may reside partially or entirely as part of the remote computing system 150. As discussed herein, the location of known landmarks and map database information, which may be stored in the map database 204 and/or the remote computing system 150, may form what is referred to herein as a "AV map data, "REM map data," or "Roadbook Map data." Thus, the one or more processors 102 may process sensory information (such as images, radar signals, depth information from LIDAR or stereo processing of two or more images) of the environment of the vehicle 100 together with position information, such as GPS coordinates, the vehicle's ego-motion, etc., to determine a current location, position, and/or orientation of the vehicle 100 relative to the known landmarks by using information contained in the AV map. The determination of the vehicle's location may thus be refined in this manner. Certain aspects of this technology may additionally or alternatively be included in a localization technology such as a mapping and routing model.

Pixel Array Weighting

Again, the one or more image acquisition devices 104 may form part of the safety system 200, and may be implemented as any suitable number and type of image-based sensors configured to acquire images within any suitable range of wavelengths, such as cameras, LIDAR sensors, etc. In any event, the one or more image acquisition devices 104 may be operated, monitored, and/or controlled via one or more components of the safety system 200, which may be implemented as part of an AV or ADAS system. For instance, the one or more processors 102, one or more of the processors 214A, 214B, 216, 218, etc. may communicate with and/or control the one or more image acquisition devices 104. This may include modifying the operating parameters of the one or more image acquisition devices 104 with respect to how images are acquired, modifying a weighting applied to exposure values identified with pixels acquired by a pixel array identified with the image acquisition devices 104 to generate output images, monitoring the settings and/or operating parameters of the one or more image acquisition devices 104, etc.

As further discussed herein, the safety system 200 may modify the exposure value weights of pixels identified with the one or more image acquisition devices 104 to ensure a high quality of images or regions of interest within captured images (e.g. the road surface, objects, etc.). This may be facilitated in accordance with the aspects as further discussed herein by adjusting the exposure weightings identified with each pixel in a pixel array, such that longer exposure time values and shorter exposure time values may be weighted more or less based upon the position of a camera with respect to the vehicle, the position of pixels within the pixel array of the image sensor, and/or other factors such as the vehicle speed, yaw, gain per exposure settings, integration time, etc. The adjustment to the pixel weightings thereby ensures that exposure values for some pixels are weighted differently than others based upon the relative motion of objects within a field of view (FoV) of the acquired images.

For instance, cameras in AV or ADAS vehicles typically function to identify objects at a far distance (e.g. 50 m) to enable the vehicle 100 to determine and react to changes observed on the road, such as a stopped car. However, this use-case becomes much more complex when objects are located at relative distances to the vehicle 100 and are travelling at different relative speeds with respect to the vehicle 100. Moreover, these differences add challenges to the camera use-case, because objects at a further distance may require a longer exposure time to be detected, and such objects may use flickering light sources such as light-emitting diodes that turn on and off quickly. In such cases, the camera integration time must exceed the oscillations or flicker of these light sources to identify them. In contrast, the objects that are closer and passing the camera faster require a shorter integration time to minimize motion blur in the captured image, as such motion blur will degrade the ability of the computer vision algorithms to classify such objects.

Figures 3C, 3D:
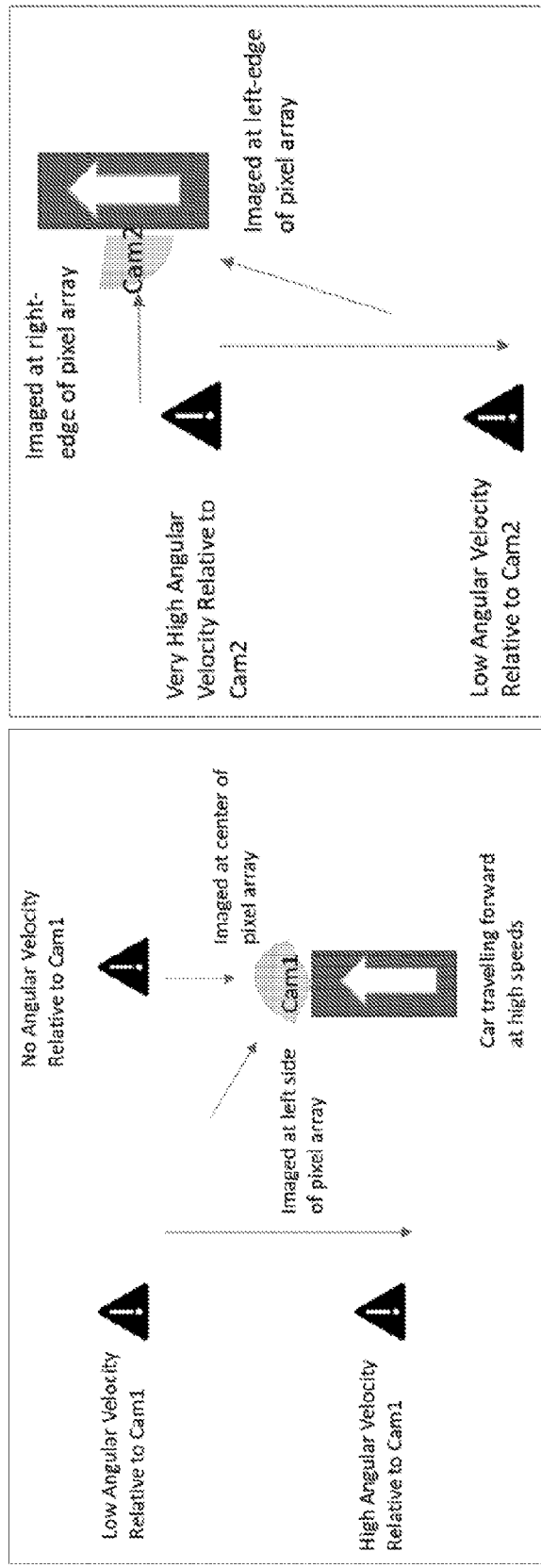
FIG. 3C illustrates examples of objects having different angular velocities with respect to the position of a front-mounted vehicle camera, in accordance with one or more aspects of the present disclosure.
FIG. 3D illustrates examples of objects having different angular velocities with respect to the position of a side-mounted vehicle camera, in accordance with one or more aspects of the present disclosure.

This issue is further demonstrated with respect to the FIGS. 3A-3D. For instance, FIG. 3A illustrates an example of the vehicle 100 travelling forward at a high velocity, whereas FIG. 3B shows the vehicle 100 stopped. The vehicle 100 as shown in FIGS. 3A-3B uses a camera that is mounted on the front of the vehicle, which has a corresponding FoV directed in the direction of travel. The objects as shown in FIG. 3A have a higher angular velocity with respect to left side of the FoV of the camera (i.e. the left side of the pixel array) compared to the object located in the front of the vehicle. Thus, the objects having a higher angular velocity are positioned towards the left portion of the pixel array of the camera compared to the object in the front of the vehicle 100. As a result, if the same exposure weightings are used across the entire pixel array, the objects imaged using the pixels at the left side of the pixel array implemented by the camera may be subjected to blur when the vehicle is in motion.

This effect is further demonstrated with respect to FIGS. 3C-3D. For instance, both FIGS. 3C and 3D show a vehicle moving forward, as was the case in FIG. 3A. However, the vehicle 100 as shown in FIG. 3C implements a front-mounted camera (like the vehicle in FIG. 3A), whereas the vehicle as shown in FIG. 3D is shown using a side-mounted camera. Thus, it is shown in FIG. 3C that the different objects have different relative angular velocities based upon their location within the FoV of the camera, i.e. with respect to their position within the pixel array of the camera. FIG. 3D also illustrates this is the case for the side-mounted camera. In other words, the relative angular velocity of objects is a function of vehicle speed and orientation with respect to imaged objects as well as the position of the imaged objects within the FoV of the cameras, which is also dependent upon the position of the cameras with respect to the vehicle.

Thus, to improve the detection of objects having different relative angular velocities with respect to the vehicle cameras, the aspects described herein provide a selective pixel exposure weighting system that functions to weight the exposure values for pixels acquired within a pixel array based upon the position of the pixel within the pixel array and other factors such as the movement and/or orientation of the vehicle, the position of the camera on the vehicle, etc. The aspects as described herein advantageously obviate the need to adapt the AV or ADAS and enable the use of the existing cameras, thereby reducing cost and time. As further discussed herein, the aspects function to selectively weight pixel exposure values to favor longer or shorter exposure times for certain pixels within the pixel array over others.

Figure 4:
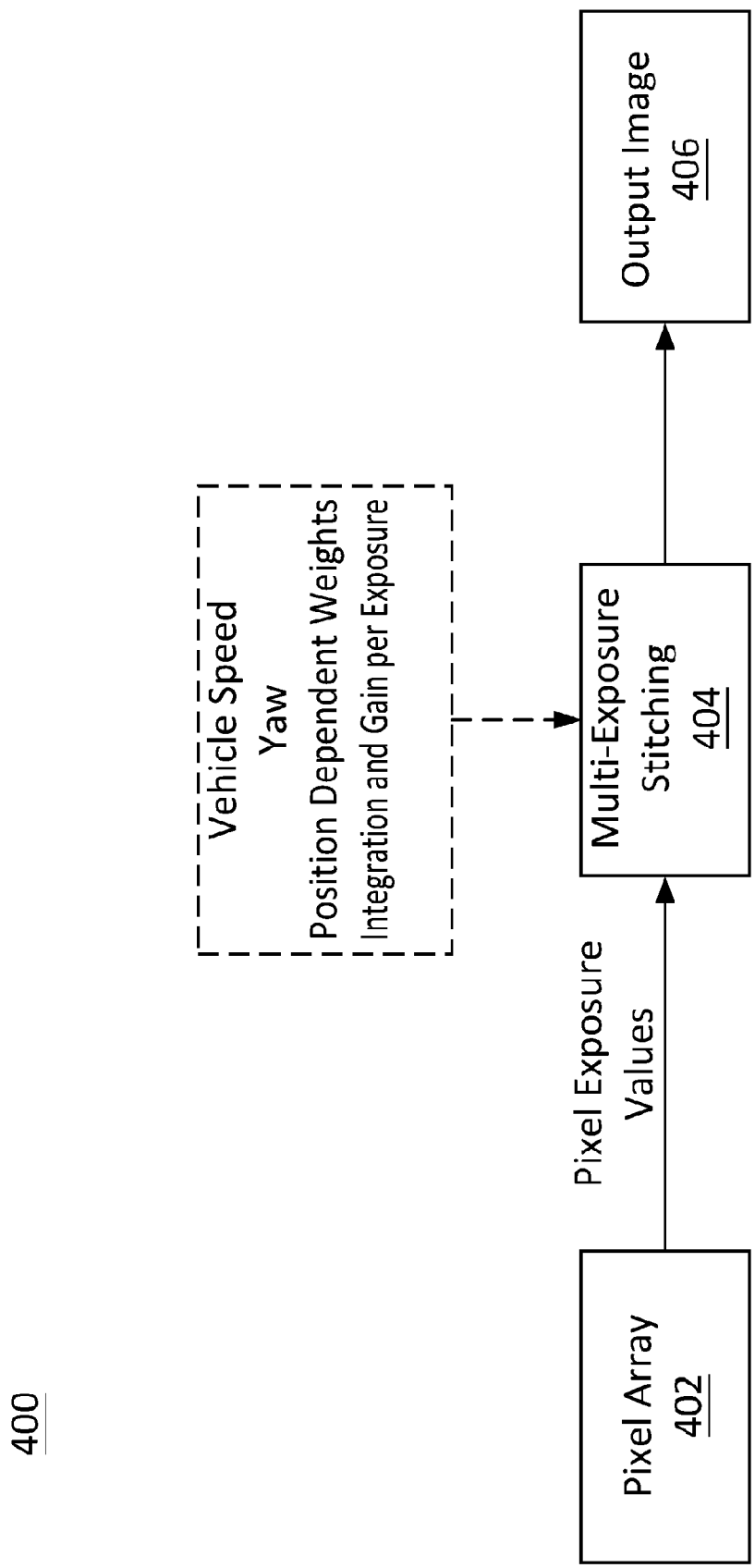
FIG. 4 illustrates an example process flow for generating an output image having selectively-weighted pixels, in accordance with one or more aspects of the present disclosure.

FIG. 4 illustrates an example process flow for generating an output image having selectively-weighted pixels, in accordance with one or more aspects of the present disclosure. The functionality associated with the process flow 400 as discussed herein with reference to FIG. 4 may be executed, for instance, via a suitable computing device and/or processing circuitry identified with the vehicle 100 and/or the safety system 200. This may include, for example, the one or more processors 102, one or more of the processors 214A, 214B, 216, 218, etc., executing instructions stored in a suitable memory (e.g. the one or more memories 202). In other aspects, the functionality associated with the process flow 400 as discussed herein with reference to FIG. 4 may be executed, for instance, via processing circuitry identified with an image sensor identified with a respective camera, which may be implemented as part of a system on a chip (SoC), an application specific integrated circuit (ASIC), or otherwise integrated as part of the image sensor that is identified with the one or more image acquisition devices 104. In still other aspects, the functionality associated with the process flow 400 as discussed herein with reference to FIG. 4 may be executed, for instance, via processing circuitry identified with any suitable type of computing device that may be identified with the vehicle 100 (e.g. a chip, an aftermarket product, etc.) or otherwise communicates with one or more components of the vehicle 100.

The process flow 400 as shown in FIG. 4 may begin with the use of a pixel array 402 that is identified with an image sensor to acquire an image and a corresponding set of pixel exposure values. The pixel exposure values represent, for each pixel identified with the image sensor, a set of exposure values. The set of exposure values may be received from a camera (i.e. an image sensor) of the one or more image acquisition devices 104 as the image is acquired, or alternatively may be stored in any suitable memory, such as the one or more memories 202 for example. Thus, the image sensor identified with the pixel array may sequentially or simultaneously capture, for each pixel, a series of long and short exposure values, i.e. exposure values identified with different integration times used by each pixel to collect a charge via a respective photodiode. A resulting pixel value may then be generated from the combined exposure values. The initial exposure values, i.e. prior to being weighted and combined as further discussed below, are determined based on the scene context (e.g. a bright or dark scene).

The multi-exposure stitching block 404 may represent the execution of a pixel-blending algorithm via any suitable type of processing circuitry, as noted above. Thus, the pixel exposure values may be provided, accessed, transmitted to, etc. the multi-exposure stitching block 404 for this purpose. In other words, the individual pixel captures (from each exposure) are transferred from the pixel array 402 to the multi-exposure stitching block 404. This may be performed in accordance with any suitable type and/or number of data interfaces that are represented by the arrow coupling the pixel array 402 to the multi-exposure stitching block 404. For instance, the multi-exposure stitching block 404 may implement additional hardware and/or software components such as a data interface, which is coupled to the image sensor identified with the pixel array 402, and enables the multi-exposure stitching block 404 to receive the pixel exposure values. Alternatively, such a data interface may facilitate the multi-exposure stitching block 404 retrieving the pixel exposure values from a suitable memory location, which have been stored via the image sensor.

The pixel-blending algorithm functions to blend or combine the different long- and short-pixel exposure values via the application of a selective exposure value weighting process. That is, aspects include the pixel-blending algorithm calculating or otherwise determining exposure value weights based upon each pixel's position within the pixel array 402 and driving conditions and/or vehicle state information such as the vehicle velocity, whether the vehicle is turning, etc. Thus, the exposure value weights used to blend the long and short exposure values to produce the resulting output image at block 406 may change based on the position of a pixel within the pixel array and other control inputs provided to the pixel-blending algorithm. In an aspect, the position dependency, and thus the specific exposure value weights to apply on a per-pixel basis, may be determined based on a position-dependent weighting map, which is a function of the camera location (i.e. the image sensor location) with respect to the vehicle and/or the direction (i.e. the FoV) identified with each respective image sensor.

Again, the set of pixel exposure values may be identified with the pixel array 402 of an image-based sensor. Thus, each pixel in the pixel array 402 may acquire two or more exposures, either sequentially (e.g. serially) or concurrently. These multiple exposures, which may each represent a respective exposure value, may be obtained in this manner using any suitable techniques, including known techniques. For instance, a high dynamic range (HDR) pixel value may be represented as a weighted sum of different pixel exposure values corresponding to different integration times, which may be used as part of a known technique for providing HDR pixel values that may then be used to generate the output image. For example, Eqn. 1 below represents a known technique for generating an output pixel value:

$$\text{Output Pixel Value} =$$ Eqn. 1
$$f(w_1 \cdot \text{HDR\_gain1}_{(exp1\ integration, gain)} \cdot \text{Exp1}_{(x,y)} +$$
$$w_2 \cdot \text{HDR\_gain2}_{(exp2\ integration, gain)} \cdot \text{Exp2}_{(x,y)} + \ldots)$$

With reference to Eqn. 1 above, the (x,y) notation indicates the physical location of the pixel identified with the output pixel value within the pixel array 402. For instance, if the pixel array 402 includes M×N pixels, then the pixel location (x,y) within the pixel array 402 may range between (0,0) and (M,N). The HDR_gain values represent the HDR gain settings that are applied to each respective exposure value Exp in addition to a respective weighting value w. Thus, for a typical HDR output image, the pixel values are calculated in accordance with Eqn. 1 above, in which the different exposure values may be weighted using information regarding the integration times and sensor gains. However, and as further noted below, current systems fail to consider the position of a pixel within the pixel array 402 to adjust the weighting values w.

Figure 6A:
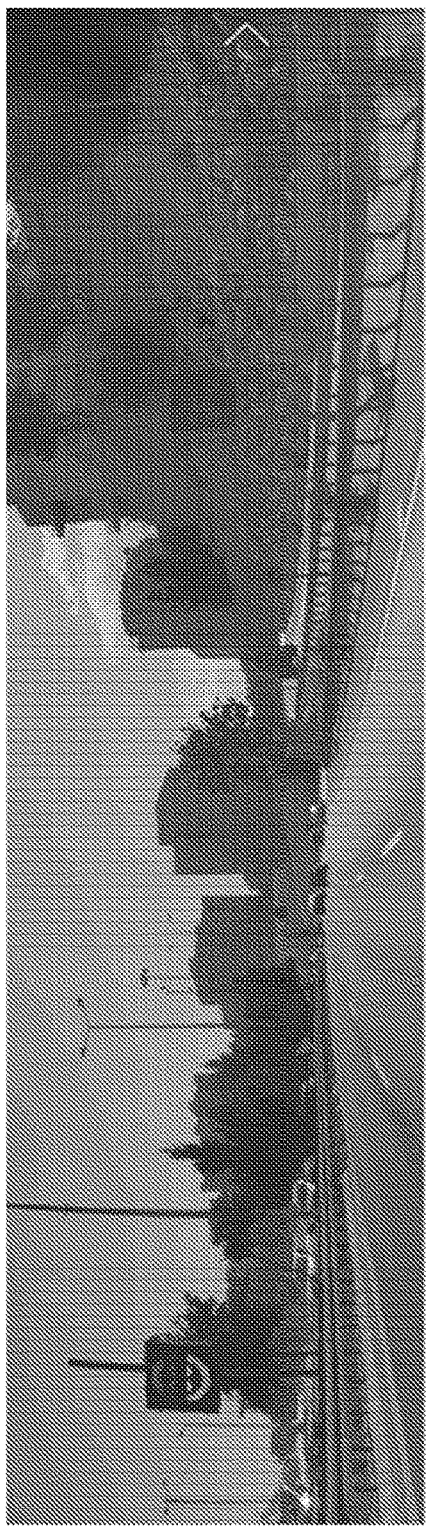
FIG. 6A-6H illustrate examples of the impact of different angular velocities on captured pixels of an image, in accordance with one or more aspects of the present disclosure.
Figure 6B:
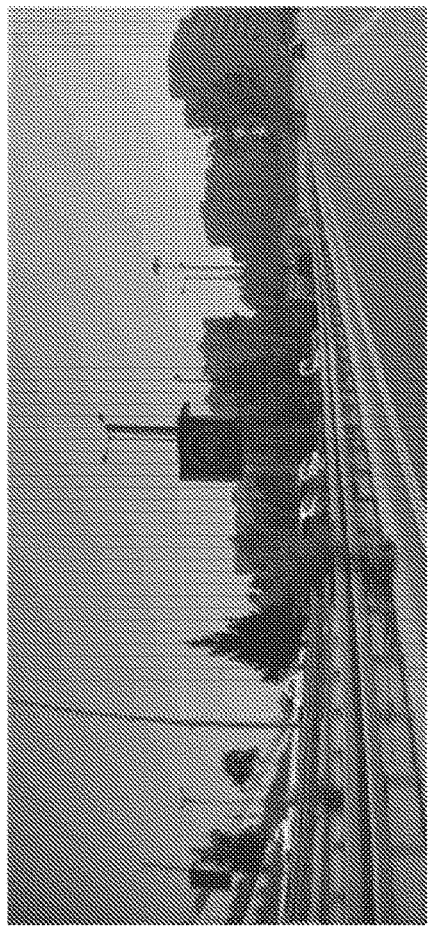
Figure 6C:
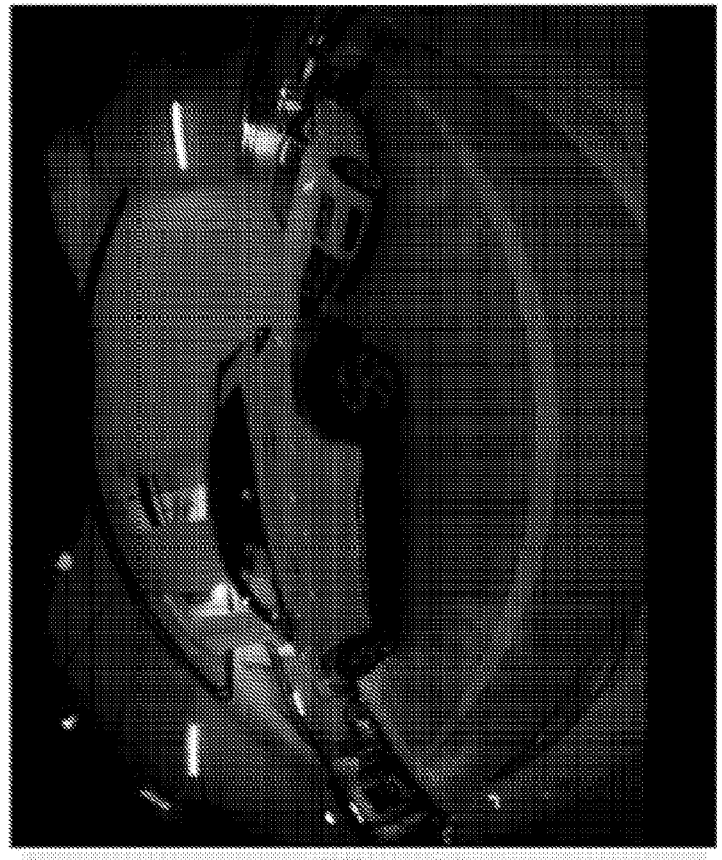
Figure 6D:
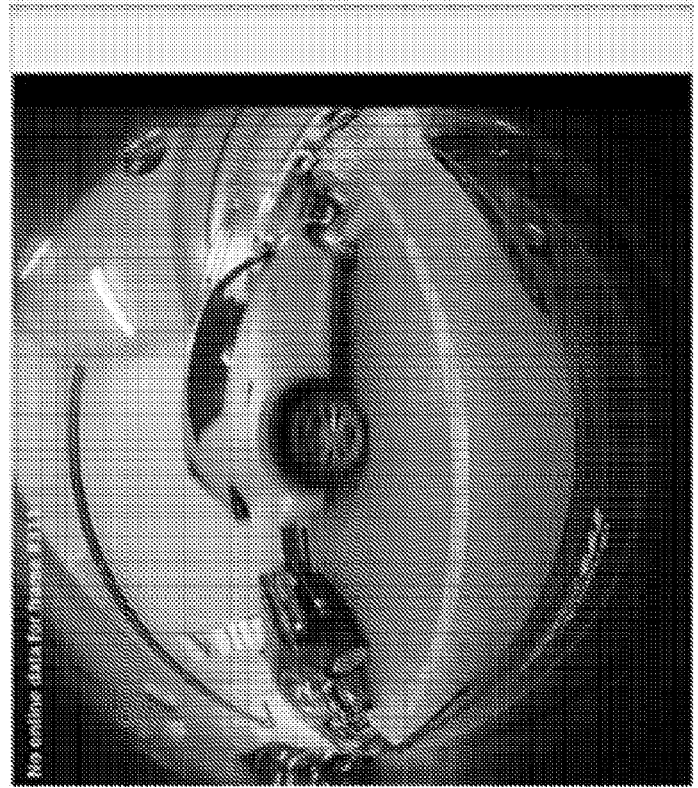

An example of failing to take the pixel location into consideration when applying the widths to the pixels in the array in a conventional manner is illustrated in FIGS. 6A-6H. As shown in FIGS. 6A, the speed limit sign includes artifacts due to the longer exposure times being weighted too heavily, as the sign includes rapidly blinking lights that are not adequately imaged with longer exposure times The FIG. 6B shows blurs in the imaged sign as a result of the longer exposure times being weighted too heavily. Moreover, FIG. 6C illustrates a side-mounted vehicle camera showing acquired image blurriness when the vehicle is turning or in motion due to the longer exposure times being weighted too heavily, which is not the case when the vehicle is not moving or turning as shown in FIG. 6D.

Figures 6E, 6F:
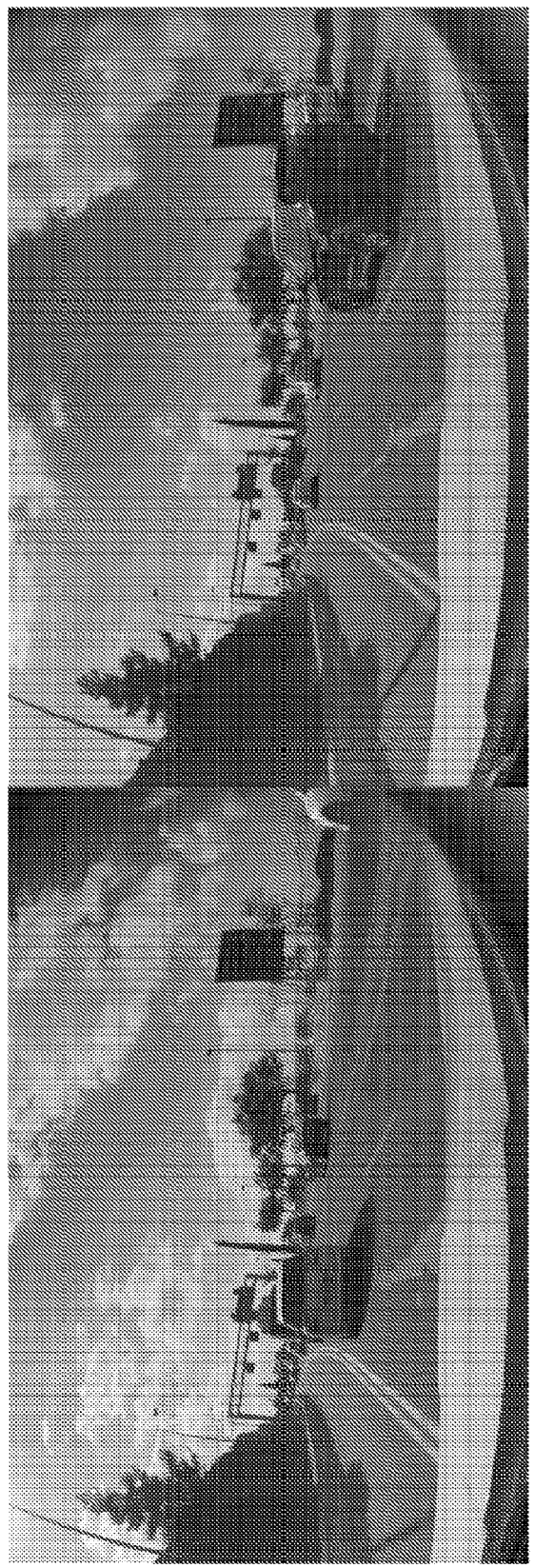
Figures 6G, 6H:
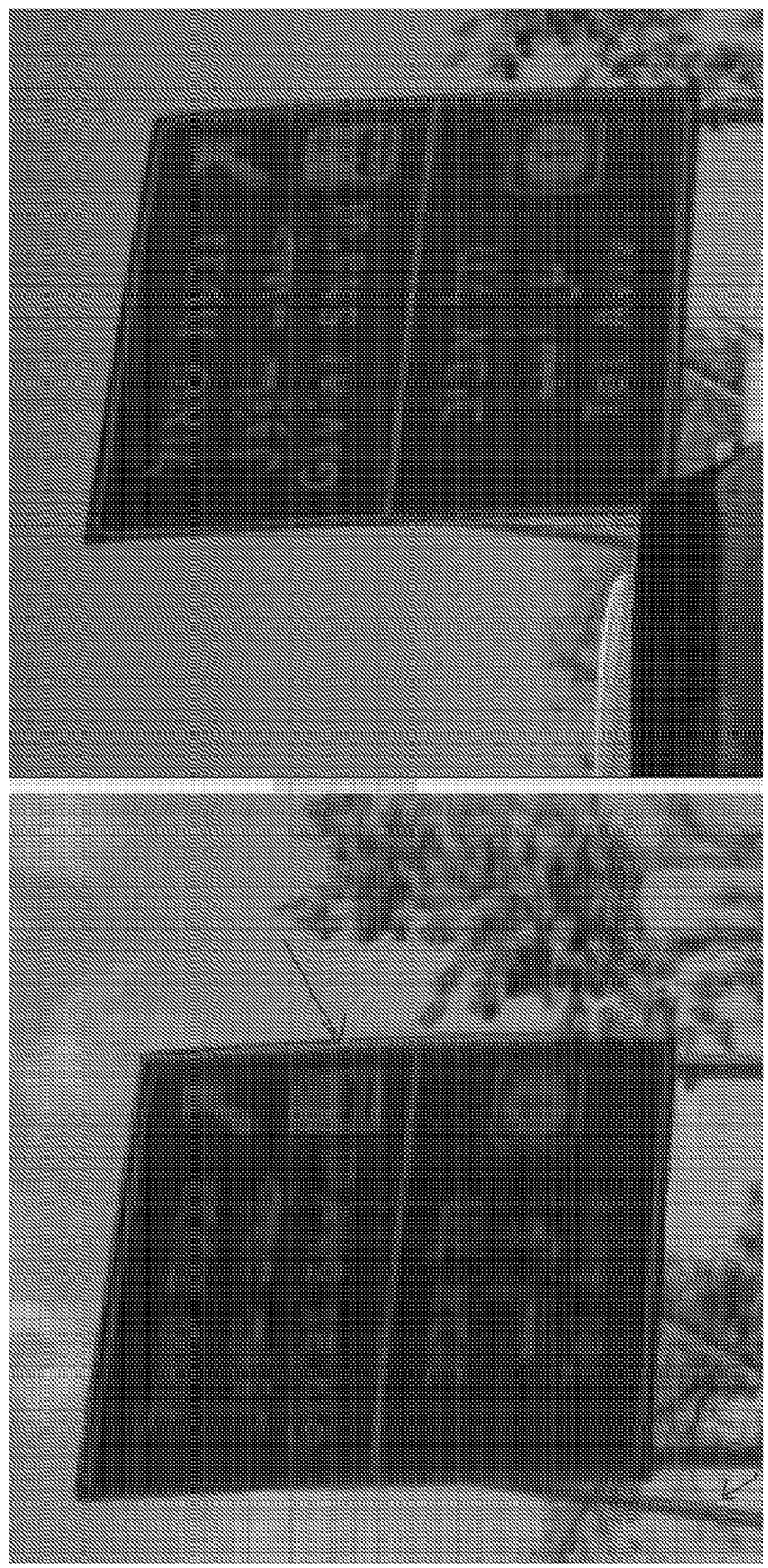

FIGS. 6E and 6F also illustrate the use of different exposure times for a vehicle while moving. The image as shown in FIG. 6E was captured in this example using an exposure time of 11 ms (long), whereas the image shown in FIG. 6F was captured using an exposure time of 1 ms (short). This is also the case for the example images in FIGS. 6G-6H, with FIG. 6G illustrating an image captured at an 11 ms exposure and FIG. 6H illustrating an image captured at a 1 ms exposure. As can be observed from each set of these images, the longer exposure time leads to noticeable blur while the vehicle is in motion.

Thus, the aspects described herein include the multi-exposure stitching block 404 receiving the set of pixel exposure values, which represent the exposure values captured for each pixel within the pixel array 402 as noted herein (e.g. with each pixel having one or more short and one or more long exposure values). The multi-exposure stitching block 404 then determines the resulting value of each pixel based on this information, which is provided to the output image block 406. For instance, this may include the application of the modified exposure values (as a result of the application of the determined exposure weights), which are then combined per pixel to provide the pixel values used to generate the output image at block 406.

Thus, the multi-exposure stitching block 404 may be coupled to a suitable memory, display, one or more image sensors identified with the vehicle 100, one or more components of the vehicle 100, etc., via any suitable number and/or type of connections, which are denoted in FIG. 4 as arrows coupling the various blocks to one another. These connections facilitate the transfer of data from the various vehicle components to those used to implement the pixel-blending algorithm executed via the multi-exposure stitching block 404 (such as via the one or more processors 102, one or more of the processors 214A, 214B, 216, 218, etc.). This data may include the pixel exposure values used to generate the output image, the vehicle state information such as vehicle speed and yaw, and/or any other suitable information used for the pixel-blending algorithm such as image-based data, which may include position dependent weights, an integration and gain per exposure, etc., as shown in FIG. 4. This data may be transferred in accordance with any suitable type and/or number of data interfaces, which again are represented by the arrows coupling the multi-exposure stitching block 404 to the other blocks as shown in FIG. 4.

Figure 5:
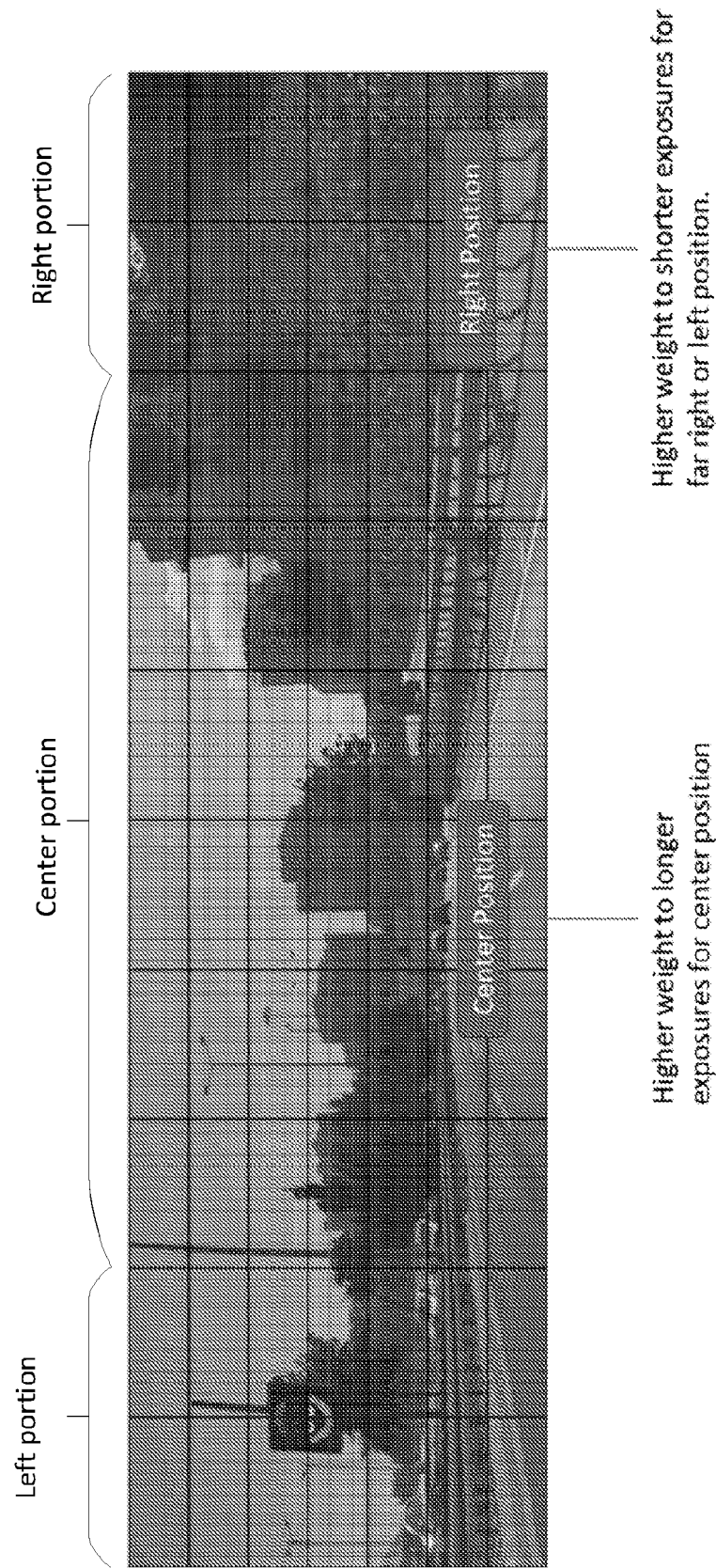
FIG. 5 illustrates an example position-dependent diagram for generating an output image having selectively-weighted pixels, in accordance with one or more aspects of the present disclosure.

The pixel-blending algorithm may use a position-dependent weighting map that functions to adjust the exposure weights used for exposure combining based upon each pixel's position within the pixel array 402, as well as other factors. For instance, each camera identified with the vehicle 100 may implement a position-dependent weighting map that functions as a "mask" to identify various portions of the pixel array. An example of such a position-dependent weighting map is shown in FIG. 5, and illustrates a left, right, and center portion for the pixel array 402. The portions of the pixel array 402 identified with the position-dependent weighting map may be of any suitable number, size, and/or shape. Thus, the portions as shown in FIG. 5 are by way of example and not limitation, and the position-dependent weighting map may include additional, fewer, or alternate portions and/or constitute alternate shapes. In any event, the pixels contained within each respective portion of the pixel array 402 are weighted in the same manner as one another, but may be weighted differently with respect to pixels in other portions of the pixel array 402. The position-dependent weighting map may also include different portions (i.e. a different number, size and/or shape or portions) for different camera locations. In other words, the pixel-blending algorithm implemented via the multi-exposure stitching block 404 may adjust the exposure weighting of each pixel within each camera's respective pixel array based upon location of the camera, the locations within the pixel array in which imaged objects may have differing angular velocities, and/or other vehicle conditions as noted herein.

For example, Eqn. 2 below represents a technique in accordance with the aspects as described herein for generating an output pixel value:

$$\text{Output Pixel Value} =$$ Eqn. 2
$$f(w_{1(x,y)} \cdot \text{HDR\_gain1}_{(exp1\ integration, gain)} \cdot \text{Exp1}_{(x,y)} +$$
$$w_{2(x,y)} \cdot \text{HDR\_gain2}_{(exp2\ integration, gain)} \cdot \text{Exp2}_{(x,y)} + \ldots)$$

With reference to Eqn. 2 above, the (x,y) notation also indicates the physical location of the pixel identified with the output pixel value within the pixel array 402, as noted above for Eqn. 1, with the other notations remaining the same as shown in Eqn. 1. However, the weights w1, w2, etc. as shown in Eqn. 2 are now position dependent, i.e. are calculated as a function of each pixel's location within the pixel array 402, as well as using other factors as noted herein.

For instance, the pixel-blending algorithm implemented via the multi-exposure stitching block 404 may calculate the weights w1, w2, etc. for each respective exposure value for each pixel within the pixel array 402 in accordance with Eqn. 3 below as follows:

$$w_{(x,y)} = w_{Pixel\ Array\ Location(x,y)} \cdot w_{Vehicle\ speed} \cdot w_{Vehicle\ yaw} \ldots \quad \text{Eqn. 3}$$

In other words, $w_{(x,y)}$ represents, for each pixel within the pixel array, a set of exposure weights w1, w2, etc. that is each respectively applied to the exposure values and HDR_gain values in accordance with Eqn. 2 above to generate the output pixel values for generating the output image. The pixel-blending algorithm may function to calculate each pixel exposure weight value for each pixel in this manner based upon multiple variables, which may include the integration and gain per exposure, the position of the pixel within the position-dependent weighting map as noted above (i.e. $w_{Pixel\ Array\ Location(x,y)}$, which is in turn dependent upon the specific vehicle camera location), and parameters of the vehicle such as a current speed and/or yaw (i.e. $w_{Vehicle\ speed} \cdot w_{Vehicle\ yaw}$). Of course, the exposure weights may be calculated using additional, fewer, or alternate parameters than those shown in Eqn. 3 and discussed herein, and thus the use of the vehicle velocity, yaw, and location of the pixel within the pixel array 402 are provided by way of example and not limitation.

Thus, aspects include the pixel-blending algorithm adjusting the exposure weight of each pixel in the pixel array of a respective camera based on the position of the pixel within the pixel array, the exposure information such as integration time and gain per exposure value, and the speed and yaw of the vehicle. To do so, the pixel-blending algorithm may receive, monitor, or otherwise have access to any suitable type of information for this purpose, which may be derived from communications with the one or more acquisition devices 104 and/or other components of the vehicle 100 to identify a camera position, vehicle speed, vehicle yaw, etc.

The exposure weights may be calculated in accordance with any suitable techniques. For instance, sets of lookup tables (LUTs) may be stored in any suitable memory of the vehicle 100 or otherwise accessed by the multi-exposure stitching block 404. The LUTs may store sets of exposure weights for corresponding inputs of the Equations 2 and 3 above, such that for a particular position within the pixel array 402, HDR gain, integration time, vehicle speed, vehicle yaw, etc., the pixel-blending algorithm retrieves a corresponding set of exposure weights for a specific pixel location within a pixel array 402 identified with a specific vehicle camera. Continuing this example, the pixel-blending algorithm may access any suitable number of LUTs in this manner per input to the Eqn. 2 as noted above. For instance, there may be separate LUTs for the pixel locations within the array for each vehicle camera location, the vehicle speed, the vehicle yaw, the HDR gain, the integration time, etc. Thus, each LUT may return a different intermediate weighting value, which may then be combined with one another in any suitable manner (e.g. multiplied as shown in Eqn. 3 above, added together, etc.) to derive the set of exposure weights based upon the various algorithm inputs.

Thus, an illustrative example is now provided with reference to FIG. 5, which illustrates an image acquired via a front-facing camera of a vehicle. As shown in FIG. 5, the center portion of the pixel array 402 includes objects with a low movement (i.e. a low angular velocity), whereas objects on left and right portions of the pixel array 402 have a high movement (i.e. a high angular velocity). Thus, in such a case it is assumed that the vehicle 100 exceeds a predetermined threshold velocity and/or a threshold yaw (e.g. exceeding a threshold acceleration in a direction identified with a turn). In either case, the pixel-blending algorithm as noted herein may, upon detecting such conditions, increase the exposure weights for short exposure values for pixels that reside in the left and/or right portions of the pixel array 402, i.e. the corresponding pixel positions in the position-dependent weighting map for the front-facing camera as noted above. Additionally, the pixel-blending algorithm may increase the exposure weights for long exposure values for pixels that reside in the center portion of the pixel array, i.e. the corresponding pixel positions in the position-dependent weighting map for the front-facing camera as noted above.

As yet another example, the pixel-blending algorithm may function to modify the exposure weightings in different ways depending upon the state or condition of the vehicle 100. For instance, a vehicle camera may have a set of different position-dependent weighting maps that each respectively correspond to different conditions. As an illustrative example, a front-facing vehicle camera may have one position-dependent weighting map associated with the vehicle travelling in excess of a predetermined threshold velocity, and another position-dependent weighting map associated with the vehicle yaw exceeding a threshold acceleration that is identified with the vehicle turning left or right. To continue this example, the pixel-blending algorithm may adjust the exposure weights to more heavily favor short exposure values for all pixels in the pixel array when an increase in yaw is detected in excess of a threshold value. However, if the vehicle speed increases with no yaw (or a yaw less than a threshold predetermined value) and thus the vehicle is driving forward or backwards, then the pixels in the left and the right side of the pixel array may have exposure weights varied to more heavily weight short exposure values, while the pixels in the center portion of the pixel array may have exposure weights adjusted to more heavily weight long exposure values, as noted above.

In this way, the exposure weights are pixel-position dependent, and may be dynamically adjusted per vehicle camera and per pixel location within the pixel array of each vehicle camera based on the vehicle speed and/or yaw. This enables a single image to be captured (i.e. the output image reconstructed using the applied exposure weights) in which objects having a low movement with respect to the FoV of each vehicle camera will be captured with more heavily weighted longer exposure values, whereas objects that are moving at a higher relative velocity are captured with more heavily weighted shorter exposure values.

Again, the aspects described herein enable the camera exposure value weightings to be adjusted based on the position of the camera on the vehicle. For example, a front-facing camera as shown in FIG. 3C may observe a greater angular velocity of movement of objects relative to the far left or right edge of the pixel array. The angular velocity of the objects may further increase as the vehicle approaches the objects and the objects are captured within the more extreme left or right portions of the pixel array, which is illustrated in FIG. 3C for objects on the left side of the vehicle. Thus, the aspects as described herein may be implemented to further portion the pixel array 402 into 5 different portions to consider such scenarios (not shown). This may include mapping the center portion of the pixel array to a set of exposure weightings for objects in front of the vehicle having little or no angular velocity, mapping respective far right and far left portions (e.g. as shown in FIG. 5) of the pixel array to a set of exposure weightings for objects in front of the vehicle having the highest angular velocity, and finally mapping respective intermediate right and intermediate left portions (not shown) of the pixel array to a set of exposure weightings for objects in front of the vehicle having a relative angular velocity between the highest and lowest, as shown in FIG. 5. Thus, as the vehicle moves forward and the angular velocity of objects change based upon their position within the pixel array, each pixel's exposure weighting values may be adjusted dynamically to compensate for these differences.

As another example, reference is now made to FIG. 3D, in which a side-mounted vehicle camera may observe a higher angular velocity based on the movement of objects relative to the side of the vehicle (very high angular velocity). However, a far left or right edge of the pixel array in the same FoV (covering the FOV typically shown by side-view mirrors) may be configured to more heavily weight longer exposure values (i.e. for the low angular velocity objects as shown). In this way, the implementation of the aspects as described herein may use a single camera to acquire images that both detect objects moving at a high speed relative to the vehicle as well as images that may function to replace the side-view mirror (i.e. e-mirror applications).

The aspects as described herein may also adjust how short and fast exposures are blended as the vehicle is changing direction. As one illustrative example, the use of short exposures may be reduced (i.e. weighted less) via the pixel-blending algorithm to reduce blur that would be introduced in bright objects (e.g. traffic lights) when the vehicle is turning. As another illustrative example, the pixel-blending algorithm may weight long exposures higher when the vehicle is travelling at lower speeds to assist in viewing-based parking applications.

Figure 7:
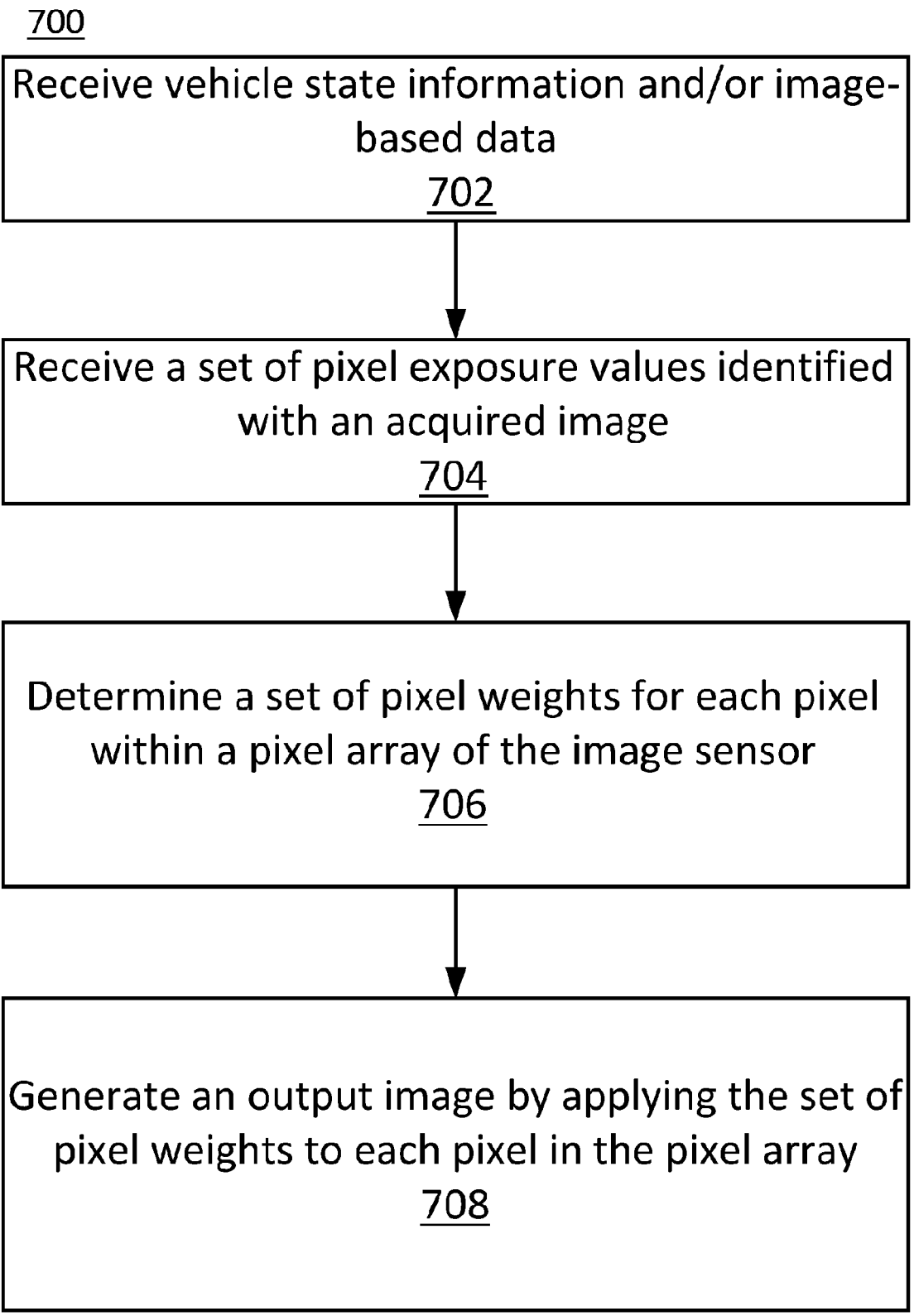
FIG. 7 illustrates an example process flow, in accordance with one or more aspects of the present disclosure.

FIG. 7 illustrates an example overall process flow, in accordance with one or more aspects of the present disclosure. With reference to FIG. 7, the flow 700 may be a computer-implemented method executed by and/or otherwise associated with one or more processors (processing circuitry) and/or storage devices. These processors and/or storage devices may be associated with one or more computing components identified with the safety system 200 of the vehicle 100 as discussed herein (such as the one or more processors 102, one or more of the processors 214A, 214B, 216, 218, etc.). Alternatively, the processors and/or storage devices may be identified with a separate computing device that may be in communication with the vehicle 100, such as an aftermarket computing device and/or the computing device 800 as shown and discussed in further detail herein with respect to FIG. 8. As yet another example, the processors and/or storage devices may be identified with the image sensor(s) themselves, e.g. as part of a chip, an SoC, or ASIC that may optionally include the image sensor as discussed herein. In the optional scenario in which the image sensor is part of such a chip, SoC, ASIC, etc., the processing may be performed via the image sensor as opposed to the vehicle controllers/processors.

In any event, the one or more processors identified with one or more of the components as discussed herein may execute instructions stored on other computer-readable storage mediums not shown in the Figures (which may be locally-stored instructions and/or as part of the processing circuitries themselves). The flow 700 may include alternate or additional steps that are not shown in FIG. 7 for purposes of brevity, and may be performed in a different order than the steps shown in FIG. 7.

Flow 700 may begin when one or more processors receive (block 702) vehicle state information. The vehicle state information may include, for example, any suitable type of information that may be used by the pixel-blending algorithm to identify the exposure weights as discussed herein. For instance, the vehicle state information may include the position of the vehicle camera, a vehicle speed, acceleration, yaw, etc. Additionally or alternatively, the one or more processors may receive (block 702) image-based data as discussed above with respect to FIG. 4, which again may include position dependent weights, an integration and gain per exposure, etc.

Flow 700 may begin when one or more processors receive (block 704) a set of pixel exposure values identified with an acquired image, i.e. an image acquired via a suitable image sensor as discussed herein. The set of pixel exposure values may include, for example, a set of different exposure values for each pixel within the pixel array of the image sensor. For instance, the set of exposure values may include a first exposure value corresponding to a first integration time (e.g. a short exposure value), a second exposure value corresponding to a second integration time (e.g. a long exposure value), etc.

Flow 700 may include one or more processors determining (block 706) a set of pixel weights to be applied to each respective exposure value for each pixel within the pixel array, as noted above. Thus, this may include the pixel-blending algorithm determining, for each respective pixel identified with the pixel array of the image sensor, a respective exposure weight to be applied to each exposure value. Again, the various exposure weights may be determined based upon the location of each respective pixel within the pixel array of the image sensor, which may be in accordance with a position-dependent weighting map that corresponds to a location of the image sensor on the vehicle. The various exposure weights may be determined based upon various factors in addition to the location of each pixel in the pixel array as described herein. For instance, the various exposure weights may be determined based upon a velocity of the vehicle, a yaw of the vehicle, etc.

The process flow 700 includes the one or more processors generating (block 708) an output image by applying the determined sets of exposure weights to the exposure values for each pixel in the pixel array. This may include combining the pixel exposure values for each pixel according to a respective set of exposure weighting as discussed herein to generate the output image that may then be used for various AV and/or ADAS functions as noted above.

Figure 8:
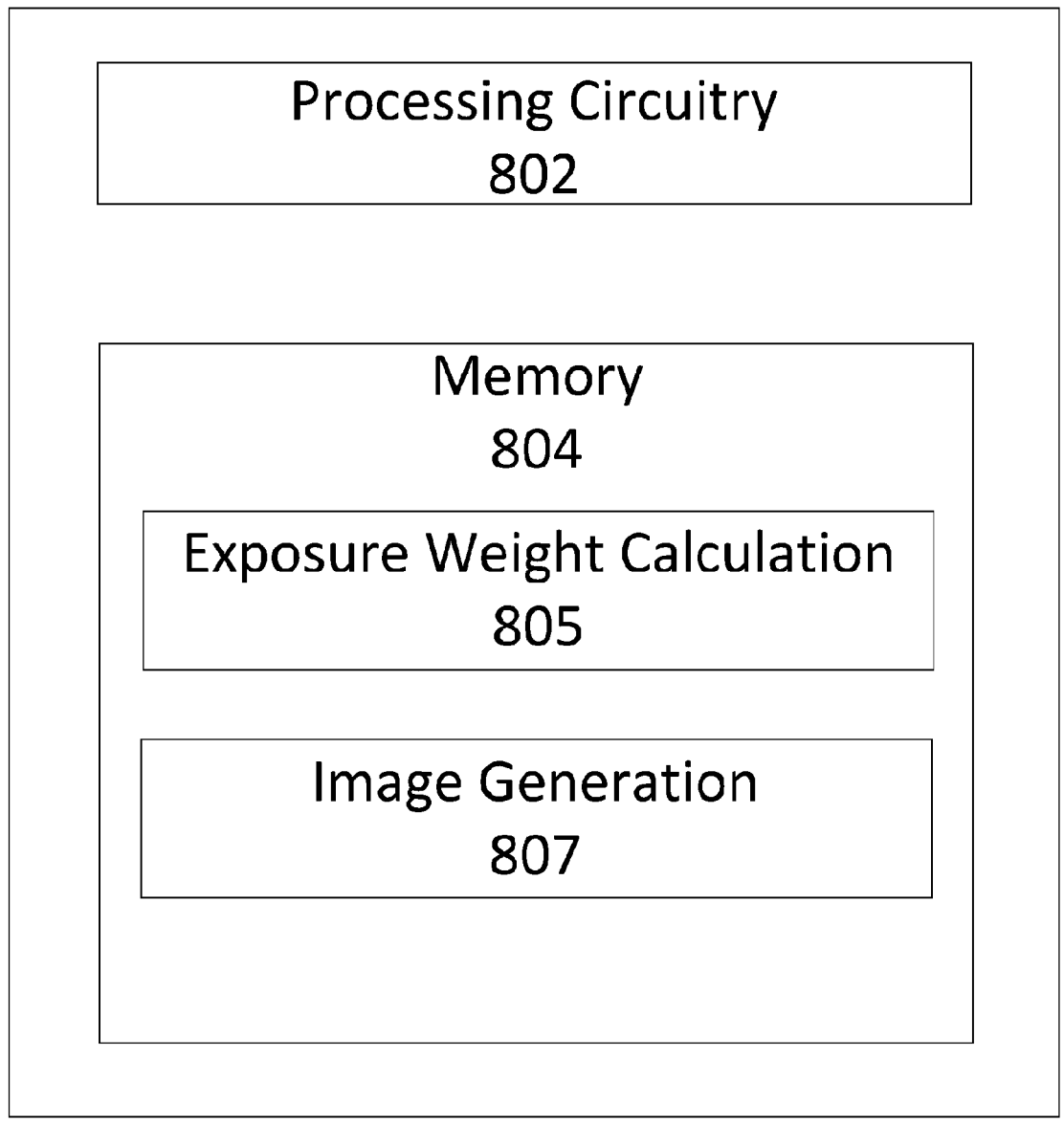
FIG. 8 illustrates an example computing device, in accordance with one or more aspects of the present disclosure.

FIG. 8 illustrates a block diagram of an exemplary computing device, in accordance with an aspects of the disclosure. In an aspect, the computing device 800 as shown and described with respect to FIG. 8 may be identified with a component of the safety system 200 as discussed herein, as a separate computing device that may be implemented within the vehicle 100 or in any suitable environment, and/or as a chip or other suitable type of integrated circuit, system on a chip (SoC), ASIC, etc. As further discussed below, the computing device 800 may perform the various functionality as described herein with respect to receiving images and/or information associated with acquired images such as exposure values, HDR gain, integration times, vehicle speed, yaw, etc., and determining exposure weights using any combination of this information.

To do so, the computing device 800 may include processing circuitry 802 and a memory 804. The components shown in FIG. 8 are provided for ease of explanation, and the computing device 800 may implement additional, less, or alternative components as those shown in FIG. 8.

The processing circuitry 802 may be configured as any suitable number and/or type of computer processors, which may function to control the computing device 800 and/or other components of the computing device 800. Alternatively, if the computing device 800 is identified with an SoC, ASIC, etc. implemented via the image sensor, the processing circuitry 802 may function to perform the same functionality as discussed herein with reference to the multi-exposure stitching block 404 such that the image sensor may output the image using the determine exposure weights. Alternatively, the determination of the exposure weights and the generation of the output image may be performed by one or more components of the vehicle 100 as noted herein. Thus, the processing circuitry 802 may be identified with one or more processors (or suitable portions thereof) implemented by the computing device 600, and may include processors identified with the safety system 200 as discussed herein (e.g. the one or more processors 102, one or more of the processors 214A, 214B, 216, 218, etc.), or the one or more image acquisition devices 104. The processing circuitry 802 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 802 may be configured to carry out instructions to perform arithmetical, logical, and/or input/output (I/O) operations, and/or to control the operation of one or more components of computing device 800, the vehicle 100, and/or the one or more image acquisition devices 104 to perform various functions as described herein. The processing circuitry 802 may include one or more microprocessor cores, memory registers, buffers, clocks, etc., and may generate electronic control signals associated with the components of the computing device 800 to control and/or modify the operation of these components. The processing circuitry 802 may communicate with and/or control functions associated with the memory 804.

The memory 804 is configured to store data and/or instructions such that, when the instructions are executed by the processing circuitry 802, cause the computing device 800 (or the vehicle 100 and/or safety system 200 of which the computing device 600 may form a part, the one or more image acquisition devices 104, etc.) to perform various functions as described herein. The memory 804 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 606 may be non-removable, removable, or a combination of both. The memory 804 may be implemented as a non-transitory computer readable medium storing one or more executable instructions such as, for example, logic, algorithms, code, etc.

As further discussed below, the instructions, logic, code, etc., stored in the memory 804 are represented by the various modules as shown in FIG. 8, which may enable the various functions of the aspects as described herein to be functionally realized. Alternatively, if implemented via hardware, the modules shown in FIG. 8 associated with the memory 804 may include instructions and/or code to facilitate control and/or monitor the operation of such hardware components. In other words, the modules as shown in FIG. 8 are provided for ease of explanation regarding the functional association between hardware and software components. Thus, the processing circuitry 802 may execute the instructions stored in these respective modules in conjunction with one or more hardware components to perform the various functions as discussed herein.

The exposure weight calculation module 805 may execute the functionality as discussed herein with reference to receiving images and/or exposure values associated with images acquired via an image-based sensor. The executable instructions stored in the exposure weight calculation module 805 may facilitate, in conjunction with execution via the processing circuitry 802, the computing device 800 determining exposure weights for each pixel in the pixel array identified with the image-based sensor as discussed herein. This may include parsing and/or retrieving the set of pixel exposure values identified with the acquired images, as well as the timing regarding when to retrieve the pixel exposure values and to calculate the exposure weights in response to various trigger conditions, e.g. the vehicle speed and/or yaw exceeding predefined thresholds.

The image generation module 807 may execute the functionality as discussed herein with reference to the generation of the output image using the exposure weights on a per-pixel basis. Again, this may include applying the determined sets of long- and short-exposure weights and combining the weighted exposure values to produce an output image.

EXAMPLES

The following examples pertain to further aspects.

An example (e.g. example 1) relates to a vehicle. The vehicle comprises an image sensor; a memory configured to store computer-readable instructions; and processing circuitry configured to execute the computer-readable instructions to cause the vehicle to: receive a set of pixel exposure values associated with an image acquired by the image sensor, the set of pixel exposure values including, for each respective pixel identified with a pixel array of the image sensor, a first exposure value corresponding to a first integration time and a second exposure value corresponding to a second integration time; determine, for each respective pixel identified with the pixel array of the image sensor, a first exposure weight to be applied to the first exposure value and a second exposure weight to be applied to the second exposure value, the first exposure weight and the second exposure weight being determined based upon a location of each respective pixel within the pixel array of the image sensor; and generate an output image based upon, for each respective pixel identified with the pixel array of the image sensor, the first exposure weight and the second exposure weight being applied to the first exposure value and the second exposure value, respectively.

Another example (e.g. example 2) relates to a previously-described example (e.g. example 1), wherein the first integration time is less than the second integration time such that the first exposure value corresponds to a shorter exposure value than the second exposure value.

Another example (e.g. example 3) relates to a previously-described example (e.g. one or more of examples 1-2), wherein the pixel array includes a center portion of pixels, a left portion of pixels, and a right portion of pixels, and wherein, when the vehicle is travelling in excess of a predetermined threshold velocity, (i) the second exposure weight applied to the center portion of pixels is greater than the first exposure weight, and (ii) the first exposure weight applied to the left portion of pixels and the right portion of pixels is greater than the second exposure weight.

Another example (e.g. example 4) relates to a previously-described example (e.g. one or more of examples 1-3), wherein the first exposure weight and the second exposure weight are determined further based upon a velocity of the vehicle.

Another example (e.g. example 5) relates to a previously-described example (e.g. one or more of examples 1-4), wherein the first exposure weight and the second exposure weight are determined further based upon a yaw of the vehicle.

Another example (e.g. example 6) relates to a previously-described example (e.g. one or more of examples 1-5), wherein the first exposure weight and the second exposure weight are determined based upon the location of each respective pixel within the pixel array of the image sensor in accordance with a predetermined position-dependent weighting map that is based upon a location of the image sensor on the vehicle.

Another example (e.g. example 7) relates to a previously-described example (e.g. one or more of examples 1-6), wherein the image sensor is from among a plurality of image sensors on the vehicle, and wherein each one of the plurality of image sensors has a different respective predetermined position-dependent weighting map.

An example (e.g. example 8) relates to a computing device. The computing device comprises: a memory configured to store computer-readable instructions; and processing circuitry configured to execute the computer-readable instructions to cause the computing device to: receive a set of pixel exposure values associated with an image acquired by an image sensor of a vehicle, the set of pixel exposure values including, for each respective pixel identified with a pixel array of the image sensor, a first exposure value corresponding to a first integration time and a second exposure value corresponding to a second integration time; determine, for each respective pixel identified with the pixel array of the image sensor, a first exposure weight to be applied to the first exposure value and a second exposure weight to be applied to the second exposure value, the first exposure weight and the second exposure weight being determined based upon a location of each respective pixel within the pixel array of the image sensor; and generate an output image based upon, for each respective pixel identified with the pixel array of the image sensor, the first exposure weight and the second exposure weight being applied to the first exposure value and the second exposure value, respectively.

Another example (e.g. example 9) relates to a previously-described example (e.g. example 8), wherein the first integration time is less than the second integration time such that the first exposure value corresponds to a shorter exposure value than the second exposure value.

Another example (e.g. example 10) relates to a previously-described example (e.g. one or more of examples 8-9), wherein the pixel array includes a center portion of pixels, a left portion of pixels, and a right portion of pixels, and wherein the computer-readable instructions further cause the computing device to, when the vehicle is travelling in excess of a predetermined threshold velocity, (i) apply the second exposure weight to the center portion of pixels having a weight that is greater than the first exposure weight, and (ii) apply the first exposure weight to the left portion of pixels and the right portion of pixels having a weight that is greater than the second exposure weight.

Another example (e.g. example 11) relates to a previously-described example (e.g. one or more of examples 8-10), wherein the computer-readable instructions further cause the computing device to determine the first exposure weight and the second exposure weight further based upon a velocity of the vehicle.

Another example (e.g. example 12) relates to a previously-described example (e.g. one or more of examples 8-11), wherein the computer-readable instructions further cause the computing device to determine the first exposure weight and the second exposure weight further based upon a yaw of the vehicle.

Another example (e.g. example 13) relates to a previously-described example (e.g. one or more of examples 8-12), wherein the computer-readable instructions further cause the computing device to determine the first exposure weight and the second exposure weight based upon the location of each respective pixel within the pixel array of the image sensor in accordance with a predetermined position-dependent weighting map that is based upon a location of the image sensor on the vehicle.

Another example (e.g. example 14) relates to a previously-described example (e.g. one or more of examples 8-13), wherein the image sensor is from among a plurality of image sensors on the vehicle, and wherein each one of the plurality of image sensors has a different respective predetermined position-dependent weighting map.

An example (e.g. example 15) relates to a method. The method comprises: receiving vehicle state information; receiving a set of pixel exposure values associated with an image acquired by an image sensor of a vehicle, the set of pixel exposure values including, for each respective pixel identified with a pixel array of the image sensor, a first exposure value corresponding to a first integration time and a second exposure value corresponding to a second integration time; determining, for each respective pixel identified with the pixel array of the image sensor, a first exposure weight to be applied to the first exposure value and a second exposure weight to be applied to the second exposure value, the first exposure weight and the second exposure weight being determined based upon a location of each respective pixel within the pixel array of the image sensor; and generating an output image based upon, for each respective pixel identified with the pixel array of the image sensor, the first exposure weight and the second exposure weight being applied to the first exposure value and the second exposure value, respectively.

Another example (e.g. example 16) relates to a previously-described example (e.g. example 15), wherein the first integration time is less than the second integration time such that the first exposure value corresponds to a shorter exposure value than the second exposure value.

Another example (e.g. example 17) relates to a previously-described example (e.g. one or more of examples 15-16), wherein the pixel array includes a center portion of pixels, a left portion of pixels, and a right portion of pixels, and further comprising: when it is determined, based upon the received vehicle state information, that the vehicle is travelling in excess of a predetermined threshold velocity: applying the second exposure weight to the center portion of pixels having a weight that is greater than the first exposure weight; and applying the first exposure weight to the left portion of pixels and the right portion of pixels having a weight that is greater than the second exposure weight.

Another example (e.g. example 18) relates to a previously-described example (e.g. one or more of examples 15-17), further comprising: determining the first exposure weight and the second exposure weight further based upon a velocity of the vehicle that is determined using the received vehicle state information.

Another example (e.g. example 19) relates to a previously-described example (e.g. one or more of examples 15-18), further comprising: determining the first exposure weight and the second exposure weight further based upon a yaw of the vehicle that is determined using the received vehicle state information.

Another example (e.g. example 20) relates to a previously-described example (e.g. one or more of examples 15-19), further comprising: determining the first exposure weight and the second exposure weight based upon the location of each respective pixel within the pixel array of the image sensor in accordance with a predetermined position-dependent weighting map that is based upon a location of the image sensor on the vehicle.

Another example (e.g. example 21) relates to a previously-described example (e.g. one or more of examples 15-20), wherein the image sensor is from among a plurality of image sensors on the vehicle, and wherein each one of the plurality of image sensors has a different respective predetermined position-dependent weighting map.

An apparatus as shown and described.

A method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A vehicle, comprising:
   an image sensor;
   a memory configured to store computer-readable instructions; and
   processing circuitry configured to execute the computer-readable instructions to cause the vehicle to:
   receive a set of pixel exposure values associated with an image acquired by the image sensor, the set of pixel exposure values including, for each respective pixel identified with a pixel array of the image sensor, a first exposure value corresponding to a first integration time and a second exposure value corresponding to a second integration time;
   determine, for each respective pixel identified with the pixel array of the image sensor, a first exposure weight to be applied to the first exposure value and a second exposure weight to be applied to the second exposure value, the first exposure weight and the second exposure weight being determined based upon a location of each respective pixel within the pixel array of the image sensor in accordance with a predetermined position-dependent weighting map that is based upon a location of the image sensor on the vehicle, the predetermined position-dependent weighting map identifying different weights to be applied to pixels in different portions within the pixel array of the image sensor; and generate an output image based upon, for each respective pixel identified with the pixel array of the image sensor, the first exposure weight and the second exposure weight being applied to the first exposure value and the second exposure value, respectively.

2. The vehicle of claim 1, wherein the first integration time is less than the second integration time such that the first exposure value corresponds to a shorter exposure value than the second exposure value.

3. The vehicle of claim 1, wherein the pixel array includes a center portion of pixels, a left portion of pixels, and a right portion of pixels, and wherein, when the vehicle is travelling in excess of a predetermined threshold velocity, the second exposure weight used for the center portion of pixels is greater than the first exposure weight.

4. The vehicle of claim 1, wherein the first exposure weight and the second exposure weight are determined further based upon a velocity of the vehicle.

5. The vehicle of claim 1, wherein the first exposure weight and the second exposure weight are determined further based upon a yaw of the vehicle.

6. The vehicle of claim 1, wherein the pixel array includes a center portion of pixels, a left portion of pixels, and a right portion of pixels, and wherein, when the vehicle is travelling in excess of a predetermined threshold velocity, the first exposure weight used for the left portion of pixels and the right portion of pixels is greater than the second exposure weight.

7. The vehicle of claim 1, wherein the pixel array includes a center portion of pixels, a left portion of pixels, and a right portion of pixels, and wherein the first exposure weight applied to the left portion of pixels and the right portion of pixels is different than the second exposure weight.

8. The vehicle of claim 1, wherein the image sensor is from among a plurality of image sensors on the vehicle, and wherein each one of the plurality of image sensors has a different respective predetermined position-dependent weighting map.

9. A computing device, comprising:

a memory configured to store computer-readable instructions; and processing circuitry configured to execute the computer-readable instructions to cause the computing device to:

receive a set of pixel exposure values associated with an image acquired by an image sensor of a vehicle, the set of pixel exposure values including, for each respective pixel identified with a pixel array of the image sensor, a first exposure value corresponding to a first integration time and a second exposure value corresponding to a second integration time;

determine, for each respective pixel identified with the pixel array of the image sensor, a first exposure weight to be applied to the first exposure value and a second exposure weight to be applied to the second exposure value, the first exposure weight and the second exposure weight being determined based upon a location of each respective pixel within the pixel array of the image sensor in accordance with a predetermined position-dependent weighting map that is based upon a location of the image sensor on the vehicle, the predetermined position-dependent weighting map identifying different weights to be applied to pixels in different portions within the pixel array of the image sensor; and generate an output image based upon, for each respective pixel identified with the pixel array of the image sensor, the first exposure weight and the second exposure weight being applied to the first exposure value and the second exposure value, respectively.

10. The computing device of claim 9, wherein the first integration time is less than the second integration time such that the first exposure value corresponds to a shorter exposure value than the second exposure value.

11. The computing device of claim 9, wherein the pixel array includes a center portion of pixels, a left portion of pixels, and a right portion of pixels, and wherein the computer-readable instructions further cause the computing device to, when the vehicle is travelling in excess of a predetermined threshold velocity, use the second exposure weight for the center portion of pixels having a weight that is greater than the first exposure weight.

12. The computing device of claim 9, wherein the pixel array includes a center portion of pixels, a left portion of pixels, and a right portion of pixels, and wherein the computer-readable instructions further cause the computing device to, when the vehicle is travelling in excess of a predetermined threshold velocity, use the first exposure weight for the left portion of pixels and the right portion of pixels having a weight that is greater than the second exposure weight.

13. The computing device of claim 9, wherein the computer-readable instructions further cause the computing device to determine the first exposure weight and the second exposure weight further based upon a velocity of the vehicle.

14. The computing device of claim 9, wherein the computer-readable instructions further cause the computing device to determine the first exposure weight and the second exposure weight further based upon a yaw of the vehicle.

15. The computing device of claim 9, wherein the image sensor is from among a plurality of image sensors on the vehicle, and wherein each one of the plurality of image sensors has a different respective predetermined position-dependent weighting map.

16. A non-transitory computer readable medium having instructions stored thereon that, when executed by processing circuitry, cause the processing circuitry to:

receive vehicle state information;

receive a set of pixel exposure values associated with an image acquired by an image sensor of a vehicle, the set of pixel exposure values including, for each respective pixel identified with a pixel array of the image sensor, a first exposure value corresponding to a first integration time and a second exposure value corresponding to a second integration time;

determine, for each respective pixel identified with the pixel array of the image sensor, a first exposure weight to be applied to the first exposure value and a second exposure weight to be applied to the second exposure value, the first exposure weight and the second exposure weight being determined based upon a location of each respective pixel within the pixel array of the image sensor in accordance with a predetermined position-dependent weighting map that is based upon a location of the image sensor on the vehicle, the predetermined position-dependent weighting map identifying different weights to be applied to pixels in different portions within the pixel array of the image sensor; and generate an output image based upon, for each respective pixel identified with the pixel array of the image sensor, the first exposure weight and the second exposure weight being applied to the first exposure value and the second exposure value, respectively.

17. The non-transitory computer readable medium of claim 16, wherein the first integration time is less than the second integration time such that the first exposure value corresponds to a shorter exposure value than the second exposure value.

18. The non-transitory computer readable medium of claim 16, wherein the pixel array includes a center portion of pixels, a left portion of pixels, and a right portion of pixels, and wherein the instructions further cause the processing circuitry, when it is determined based upon the received vehicle state information that the vehicle is travelling in excess of a predetermined threshold velocity, to use the second exposure weight for the center portion of pixels having a weight that is greater than the first exposure weight.

19. The non-transitory computer readable medium of claim 16, wherein the pixel array includes a center portion of pixels, a left portion of pixels, and a right portion of pixels, and wherein the instructions further cause the processing circuitry, when it is determined based upon the received vehicle state information that the vehicle is travelling in excess of a predetermined threshold velocity, to use the first exposure weight for the left portion of pixels and the right portion of pixels having a weight that is greater than the second exposure weight.

20. The non-transitory computer readable medium of claim 16, wherein the instructions further cause the processing circuitry to determine the first exposure weight and the second exposure weight further based upon a velocity of the vehicle that is determined using the received vehicle state information.

21. The non-transitory computer readable medium of claim 16, wherein the instructions further cause the processing circuitry to determine the first exposure weight and the second exposure weight further based upon a yaw of the vehicle that is determined using the received vehicle state information.

22. The non-transitory computer readable medium of claim 16, wherein the image sensor is from among a plurality of image sensors on the vehicle, and
   wherein each one of the plurality of image sensors has a different respective predetermined position-dependent weighting map.

* * * * *